US012798319B2

(12) United States Patent
Oscarsson et al.

(10) Patent No.: US 12,798,319 B2
(45) Date of Patent: Nov. 17, 2026

(54) HANDLING EVASIVE MANEUVERS IN A TRACTOR-TRAILER VEHICLE COMBINATION

(71) Applicant: VOLVO TRUCK CORPORATION, Gothenburg (SE)

(72) Inventors: Christian Oscarsson, Stenungsund (SE); Mattias Holmberg, Gothenburg (SE); Charlotte Holmen, Gothenburg (SE); Basar Özkan, Gothenburg (SE); Vinay Kumbhar, Stockholm (SE); Sumeet Kumar, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 19/225,338

(22) Filed: Jun. 2, 2025

(65) Prior Publication Data

US 2025/0367997 A1 Dec. 4, 2025

(30) Foreign Application Priority Data

Jun. 3, 2024 (SE) .................................... 2450596-8

(51) Int. Cl.
*B60G 17/016* (2006.01)

(52) U.S. Cl.
CPC ........ *B60G 17/016* (2013.01); *B60G 2204/62* (2013.01); *B60G 2300/042* (2013.01);
(Continued)

(58) Field of Classification Search
CPC .............. B60G 17/016; B60G 2204/62; B60G 2300/042; B60G 2400/05;
(Continued)

(56) References Cited

U.S. PATENT DOCUMENTS 7,072,763 B2 * 7/2006 Saxon .................. G01G 19/086 177/136
2002/0035871 A1 * 3/2002 Pallot .................... B60T 8/1755 73/488

(Continued)

FOREIGN PATENT DOCUMENTS

CN 110775046 B 2/2023
EP 4183601 A1 5/2023
WO 2024012706 A1 1/2024

OTHER PUBLICATIONS

Swedish Office Action and Search Report in corresponding Swedish Application No. 2450596-8 dated Feb. 10, 2025 (11 pages).

*Primary Examiner* — Yi-Kai Wang
(74) *Attorney, Agent, or Firm* — Jeffri A. Kaminski; Venable LLP

(57) ABSTRACT

A computer-implemented method for controls stability of a vehicle, being a truck or tractor and at least one trailer comprising at least two wheel axles and an electronically controllable suspension system. The method identifies a possible instability state of the vehicle; determines a type of an event that has caused the possible instability state; determining one or more actions comprising adjusting a load distribution between the at least two wheel axles of the trailer based on the possible instability state and based on the type of the event that has caused the possible instability state; and generates and sending a control command to the suspension system to perform the actions. The actions may comprise adjusting the load distribution between the at least two wheel axles of the trailer such that a load on a rear axle is increased and a load on a front axle is decreased.

19 Claims, 16 Drawing Sheets

(52) U.S. Cl.
CPC .. *B60G 2400/05* (2013.01); *B60G 2400/0511* (2013.01); *B60G 2400/0521* (2013.01); *B60G 2400/0523* (2013.01); *B60G 2400/104* (2013.01); *B60G 2400/106* (2013.01); *B60G 2400/204* (2013.01); *B60G 2400/2042* (2013.01); *B60G 2400/41* (2013.01); *B60G 2400/44* (2013.01); *B60G 2400/821* (2013.01); *B60G 2400/823* (2013.01); *B60G 2400/972* (2013.01); *B60G 2500/104* (2013.01); *B60G 2500/30* (2013.01); *B60G 2600/182* (2013.01); *B60G 2800/00* (2013.01); *B60G 2800/012* (2013.01); *B60G 2800/0124* (2013.01); *B60G 2800/24* (2013.01); *B60G 2800/242* (2013.01); *B60G 2800/914* (2013.01); *B60G 2800/915* (2013.01); *B60G 2800/94* (2013.01)

(58) Field of Classification Search
CPC .... B60G 2400/0511; B60G 2400/0521; B60G 2400/0523; B60G 2400/104; B60G 2400/106; B60G 2400/204; B60G 2400/2042; B60G 2400/41; B60G 2400/44; B60G 2400/821; B60G 2400/823; B60G 2400/972; B60G 2500/104; B60G 2500/30; B60G 2600/182; B60G 2800/00; B60G 2800/012; B60G 2800/0124; B60G 2800/024; B60G 2800/242; B60G 2800/914; B60G 2800/915; B60G 17/0164; B60G 17/0162; B60G 2800/214; B60W 10/20; B60W 2720/14; B60W 30/02; B60W 30/18163; B60W 2520/125; B60W 2520/14; B60W 2520/18; B60W 2520/22
USPC .......................................................... 701/38
See application file for complete search history.

(56) References Cited

U.S. PATENT DOCUMENTS

| | | | | |
|---|---|---|---|---|
| 2006/0244579 | A1 | 11/2006 | Raab | |
| 2022/0203999 | A1 | 6/2022 | Lin et al. | |
| 2024/0010186 | A1 | 1/2024 | Dhaens et al. | |
| 2024/0132053 | A1 * | 4/2024 | De Pinto ............ | B60G 17/0162 |

* cited by examiner

Simulation Data 50 kmph

Simulation Data 50 kmph

Test Data 70 kmph

HANDLING EVASIVE MANEUVERS IN A TRACTOR-TRAILER VEHICLE COMBINATION

TECHNICAL FIELD

The disclosure relates generally to a field of vehicle motion management. In particular aspects, the disclosure relates to controlling a trailer in a tractor-trailer vehicle combination for handling hazardous situations where the combination experiences a potential rollover, jack-knifing, or a trailer swing-out situation. The disclosure can be applied in heavy-duty vehicles, such as trucks, buses, and construction equipment. Although the disclosure may be described with respect to a particular vehicle, the disclosure is not restricted to any particular vehicle.

BACKGROUND

Articulated vehicle combinations, such as a tractor or truck and one or more trailers coupled thereto, can become unstable at various road situations. The instability may lead to trailer swing or swing-out, jack-knifing or rollover, which can occur if the tractor and trailer brake in a certain way, particularly on low friction surfaces. These can create dangerous traffic situations.

Jack-knifing of a lead vehicle unit such as a tractor or truck in an articulated heavy vehicle causes the lead unit to pivot backward into a towed vehicle unit such as a trailer. A jack-knife instability happens when the rear wheels of the lead unit are locked up due to improper and hard braking, or slippery or poor-conditioned roads. Trailer swing-out may relate to a trailer of a vehicle swinging out to the side of the vehicle in an uncontrollable manner. Trailer swing-out instability typically happens when trailer brakes lock up on a slippery surface.

When a dangerous situation is possible on the road, a driver of the vehicle typically reduces vehicle longitudinal speed and/or performs a yaw or sideward motion. In case of a quick appearance of the obstacle, swerving around the obstacle in combination with braking and steering can be more effective than only deceleration, to avoid an imminent collision. This type of swerving motion in crash-imminent situations is usually called an evasive manoeuvre.

Lock-up of brakes is one typical cause of yaw instability. However, often a full lock-up does not happen due to an anti-lock braking system (ABS), Electronic Stability Control (ESC) system, and/or electronic brake system (EBS) avoiding such a lock-up. For the ABS, ESC system, and/or the EBS, the slip may instead grow too much such that there is a low lateral force capability left. For these scenarios, lateral grip cannot be maintained which also causes yaw instability such as a trailer swing-out and/or jack-knifing.

One way of stabilizing a jack-knifing vehicle is to use stability controllers which perform differential braking or stretch-braking. Stretch braking means to brake the trailer more than the tractor, hence the trailer pulls the tractor. It makes the combination more stable and helps to avoid jack-knifing situation.

In some cases, a driver may also detect yaw instabilities manually, and can then try to brake, release brakes, and/or turn a steering angle accordingly to try to resolve the yaw instability.

However, the above approaches can typically only try to resolve a yaw instability such as a trailer swing or jack-knifing when the instability have already started to occur, at which point it may be too late to avoid a dangerous situation completely. Moreover, a lane change or overtaking by the vehicle combination may require measures to ensure vehicle stability which are different from measures taken when the vehicle suddenly brakes.

Hence, a need exists for improved ways to manage stability of a vehicle combination.

SUMMARY

According to aspects of the disclosure, a computer system and a computer-implemented method for preparing a vehicle combination for an evasive maneuver or another type of a maneuver are provided. The maneuver may refer to braking, a lane change, overtaking of another vehicle, turning, or another maneuver.

According to a first aspect of the disclosure, a computer-implemented method for controlling stability of a vehicle, comprising a truck or tractor and at least one trailer comprising at least two wheel axles and an electronically controllable suspension system, is provided. The method comprises, by a processor device of a computer system, identifying a possible instability state of the vehicle; determining a type of an event that has caused the possible instability state of the vehicle; determining one or more actions comprising adjusting a load distribution between the at least two wheel axles of the trailer based on the possible instability state of the vehicle and based on the type of the event that has caused the possible instability state of the vehicle; and generating and sending a control command to the suspension system to perform the one or more actions.

The first aspect of the disclosure may seek to prevent and/or to mitigate a yaw instability, e.g., jack-knifing, rollover, or trailer swing-out, in the vehicle. A technical benefit may include that the safety of the vehicle, its driver/passenger(s) and surrounding road users is improved. This is since the one or more trailers of the vehicle may be prepared for an evasive maneuver in time. The one or more trailers, such as e.g. a semitrailer or a dolly, may be prepared for an evasive maneuver prior to the yaw instability occurrence which significantly reduces the danger presented by the yaw instability.

Another technical benefit may include increasing a roll-torque capacity of the vehicle during evasive maneuvers. When a driver turns the steering wheel of the vehicle, there will be a delay until a maximum trailer lateral acceleration is reached. During this delay, the load distribution may be changed from a load distribution that improves stability during braking or an evasive maneuver, to a normal load distribution after the maneuver is completed. A technical benefit may include improving stability of the vehicle. Hence, a technical benefit may include further improvement of safety of the vehicle, its driver/passenger(s) and surrounding road users.

The identified possible instability state of the vehicle may be a detected possible instability state of the vehicle and/or predicted possible instability state of the vehicle.

In some examples, the type of event that has caused the possible instability state of the vehicle comprises one or more of braking, a lane change, overtaking another vehicle, turning, and/or performing an evasive maneuver by the vehicle.

Thus, aspects of the present disclosure advantageously allow mitigating or avoiding risks in various road situations.

In some examples, identifying the possible instability state of the vehicle is performed by determining a steering angle, a steering rate, a steering acceleration, and a value of at least one motion parameter of the vehicle.

In some examples, the at least one motion parameter of the vehicle comprises one or more of a speed, a longitudinal velocity, a lateral velocity, a yaw rate, a lateral acceleration, a longitudinal acceleration, a roll rate, a roll angle, and an articulation angle of the vehicle.

In some examples, in the method, determining the type of the event that has caused the possible instability state of the vehicle comprises determining that the instability state of the vehicle is caused by one or more of the lane change, overtaking another vehicle, turning, and/or performing the evasive maneuver by the vehicle, by determining that one or more of the steering rate exceeds a steering rate threshold value, the steering acceleration exceeds a steering acceleration threshold value, and that the longitudinal velocity exceeds a longitudinal velocity threshold value.

In some examples, when it is determined that the instability state of the vehicle is caused by one or more of the lane change, overtaking another vehicle, and/or performing the evasive maneuver by the vehicle, the one or more actions comprise one or more out of:

(i) adjusting the load distribution between the at least two wheel axles such that a load on a rear axle of the trailer is increased and a load on a front axle of the trailer is decreased;
(ii) lowering a height of the trailer;
(iii) stiffening the controllable suspension system of the trailer; and
(iv) increasing a roll damping of the trailer by using the controllable suspension system.

A technical benefit may include that, by performing the action (i), comprising adjusting the load distribution between the at least two wheel axles such that a load on a rear axle of the trailer is increased and a load on a front axle of the trailer is decreased, the amplification of the yaw rate is decreased. The load is shifted from the front axle, e.g., one or more forward axles, to the rear axle, e.g. one or more rearward axles. This improves stability of the vehicle combination. As another technical benefit, an Electronic Stability Control (ESC) system may not become activated due to the improved stability of the vehicle combination. The stability of the vehicle combination may thus be maintained and/or improved without the ESC system being activated and thus without the unnecessary activation of vehicle brakes.

A technical benefit may include that, by performing one or more of the actions (ii)-(iv), possibly in combination with the action (i), decreasing a risk of a roll-over of the vehicle. A technical benefit may include improving stability of the vehicle. Hence, a technical benefit may include further improvement of safety of the vehicle, its driver/passenger(s) and surrounding road users.

In some examples, the method further comprises, by the processor device, selecting one or more actions out of the actions (i) to (iv) based on predicting a roll-over of the vehicle and/or predicting a swing-out of the vehicle.

In some examples, the method further comprises, by the processor device, when the at least one trailer comprises two or more trailers, selecting one or more different combinations of actions out of the actions (i) to (iv) for respective trailers of the two or more trailers.

In some examples, adjusting the load distribution between the at least two wheel axles of a trailer of the two or more trailers comprises increasing a load on a rear axle of the trailer of the two or more trailers. The rear axle may comprise one or more rear or rearward axles.

In some examples, adjusting the load distribution between the at least two wheel axles of a trailer of the two or more trailers comprises increasing a load on a rear-most axle of the trailer of the two or more trailers up to a possible physical limit for the rear-most axle and increasing a load on at least one next rear-most axle of the trailer of the two or more trailers up to a possible physical limit for the at least one next rear-most axle until the load distribution is completed.

In some examples, determining the one or more actions, comprising adjusting the load distribution between the at least two wheel axles, is performed based on a yaw rate amplification of the vehicle and/or the at least one trailer.

A technical benefit includes improving stability of the vehicle. Hence, a technical benefit may include further improvement of safety of the vehicle, its driver/passenger(s) and surrounding road users.

In some examples, when it is determined that the instability state is caused by the braking of the vehicle, the one or more actions comprise adjusting the load distribution between the at least two wheel axles based on a braking capability of each wheel axle of the at least two wheel axles and/or based on a braking capability of the trailer.

A technical benefit includes improving stability of the vehicle. Hence, a technical benefit may include further improvement of safety of the vehicle, its driver/passenger(s) and surrounding road users.

In some examples, identifying the instability state is based on one or more out of a predicted upcoming change in operating conditions of the vehicle, road topography, traffic conditions, a predicted steering angle, a predicted steering rate, a predicted steering acceleration, and a predicted value of the at least one predicted motion parameter of the vehicle.

A technical benefit may include predicting an upcoming instability of the vehicle and instructing the controllable suspension system of the at least one trailer to perform one or more actions to maintain and/or improve the stability of the vehicle. Hence, a technical benefit may include further improvement of safety of the vehicle, its driver/passenger(s) and surrounding road users.

According to a second aspect of the disclosure, a vehicle is provided that comprises a processor device configured to perform the method according to the first aspect. The vehicle comprises a truck or tractor and at least one trailer. Advantages and effects of the vehicle are largely analogous to the advantages and effects of the method according to the first aspect. Further, all embodiments of the vehicle are applicable to and combinable with all embodiments of the method according to the first aspect, and vice versa.

In some examples, the at least one trailer comprises one or more of at least one trailer, at least one semitrailer, and at least one dolly.

In some examples, the one or more of the at least one trailer, the at least one semitrailer, and the at least one dolly are coupled to the truck or tractor in accordance with a speed of actuators for their respective suspension systems, such that the one or more of the at least one trailer, the at least one semitrailer, and the at least one dolly comprising a fastest actuator is directly coupled to the truck or tractor.

A technical benefit may include improving stability of a longer vehicle combination such as e.g. a combination comprising two or more trailers of a suitable type. Hence, a technical benefit may include further improvement of safety of the vehicle, its driver/passenger(s) and surrounding road users.

According to a third aspect of the disclosure, a computer program product is provided. The computer program product comprises program code for performing, when executed by the processor device, the method according to the first aspect. Advantages and effects of the computer program product are largely analogous to the advantages and effects of the method according to the first aspect. Further, all embodiments of the computer program product are applicable to and combinable with all embodiments of the method according to the first aspect, and vice versa.

According to a fourth aspect of the disclosure, a control system is provided controlling a vehicle comprising a truck or tractor and at least one trailer. The control system is configured to communicate with a controllable suspension system of the at least trailer, and the control system comprises one or more control units configured to perform, by a processor device, the method according to the first aspect. The control system may be a computer system. Advantages and effects of the control system are largely analogous to the advantages and effects of the method according to the first aspect. Further, all embodiments of the control system are applicable to and combinable with all embodiments of the method according to the first aspect, and vice versa.

According to a fifth aspect of the disclosure, a non-transitory computer-readable storage medium is provided. The non-transitory computer-readable storage medium comprises computer-executable instructions, which when executed by the processor device, cause the processor device to perform the method according to the first aspect. Advantages and effects of the non-transitory computer-readable storage medium are largely analogous to the advantages and effects of the method according to the first aspect. Further, all embodiments of the non-transitory computer-readable storage medium are applicable to and combinable with all embodiments of the method according to the first aspect, and vice versa.

According to a sixth aspect of the disclosure, a trailer for a vehicle combination is provided that is configured to be controlled using the method according to the first aspect. The trailer may be a trailer, a semitrailer, a dolly, or any other vehicle configured to be towed by a powered vehicle such as a tractor or a trailer. The trailer comprises an electronically controllable suspension system that is arranged and configured to be controlled by the control system according to the fourth aspect.

Advantages and effects of the non-transitory computer-readable storage medium are largely analogous to the advantages and effects of the method according to the first aspect. Further, all embodiments of the non-transitory computer-readable storage medium are applicable to and combinable with all embodiments of the method according to the first aspect, and vice versa.

The above aspects, accompanying claims, and/or examples disclosed herein above and later below may be suitably combined with each other as would be apparent to anyone of ordinary skill in the art.

Additional features and advantages are disclosed in the following description, claims, and drawings, and in part will be readily apparent therefrom to those skilled in the art or recognized by practicing the disclosure as described herein.

BRIEF DESCRIPTION OF THE DRAWINGS

With reference to the appended drawings, below follows a more detailed description of aspects of the disclosure cited as examples.

DETAILED DESCRIPTION

Figure 1:
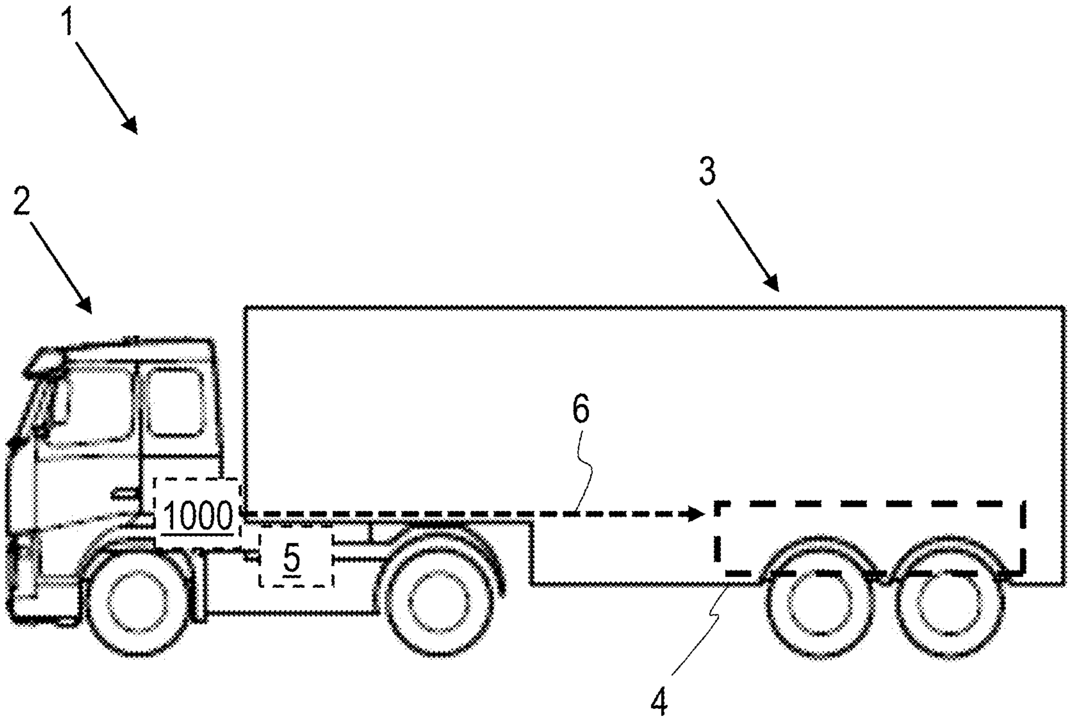
FIG. 1 illustrates an example of a vehicle comprising a trailer.

Aspects set forth below represent the necessary information to enable those skilled in the art to practice the disclosure.

A yaw instability in a vehicle, e.g., a trailer swing or swing-out, rollover, or a jack-knifing event, may cause a dangerous situation for a driver of the vehicle and the surroundings of the vehicle. This becomes particularly dangerous for a longer vehicle combination comprising more than one trailer or another type of a towed vehicle such as a semitrailer or a dolly. An electronically controlled suspension system on the trailer enables functions where the axle load distribution of the trailer can be selected as suitable to meet various objectives, such as fuel efficiency or traction. In these cases, however, the load distribution between the trailer axles may not be most suitable for safety, for example in a braking situation or when the vehicle carries out an evasive maneuver. Some existing trailers are equipped with electronic brake systems which have roll-over protection and other stability functions. There may be, however, no communication between a tractor and at least one trailer coupled to the tractor regarding tractor instability or evasive maneuvers.

Accordingly, examples in accordance with the present disclosure provide a computer-implemented method and a computer system for controlling stability of a vehicle comprising a truck or tractor and at least one trailer comprising at least two wheel axles and an electronically controllable suspension system. The controllable suspension system is configured to receive control commands from the computer system which commands cause the suspension system to perform one or more actions that stabilize the trailer and the entire vehicle, whereby a dangerous situation may be mitigated, prevented, or avoided. The method may identify, such as determine or detect or predict, a possible instability state of the vehicle an instability state of the vehicle, which may be done by measuring a steering angle, a steering rate, a steering acceleration, and at least one motion parameter of the vehicle. Operation of a steering wheel of the tractor may be monitored and changes in the steering angle, steering rate, and steering acceleration may be detected.

The method may also identify a type of an event that has caused the possible instability state of the vehicle and to determine, based on the possible instability state of the vehicle and based on the type of the event that has caused the possible instability state, one or more actions comprising adjusting a load distribution between the at least two wheel axles of the trailer. The load may be distributed in the manner that best maintains the stability of the vehicle during the current or possible event in which an evasive maneuver by the vehicle is required. The method further comprises generating and sending a control command to the suspension system of the trailer to perform the one or more actions. The control command, along with any relevant information, may be sent to the trailer through added signals on a standard interface, such as e.g. a controller area network (CAN)-based vehicle bus standard, via an automotive Ethernet connection, or via any other suitable connection.

FIG. 1 is an exemplary vehicle 1 according to an example. The vehicle 1 may be a vehicle combination comprising a truck or tractor 2, referred to as a tractor, configured to be coupled to at least one trailer 3 that is pulled or towed by the tractor 2. The vehicle 1 may be an autonomous or a semi-autonomous vehicle. The trailer 3 has an electronically controlled suspension system 4, shown very schematically in FIG. 1, that comprises multiple e.g. two or more wheel axles. The vehicle 1 comprises one or more safety systems 5 such as e.g. an anti-lock braking system (ABS), Electronic Stability Control (ESC) system, electronic brake system (EBS), and/or another safety system.

Embodiments herein may be performed using a computer system 1100, e.g. as part of an Electronic Control Unit (ECU) in the vehicle 1. The computer system 1100 may be a control system that is configured to perform a method in accordance with examples herein. The control system may be configured to receive measurements acquired by various sensor systems associated with the vehicle, e.g., a gyroscope/accelerometer, an image sensor e.g. one or more cameras, a lane sensor, an infrared sensor, a light detection and ranging (LiDAR) sensor, an orientation sensor, a vehicle speed sensor, a roll sensor, a position sensor, a steering sensor, a yaw rate sensor, and/or various other sensor systems that allow determining a steering angle, a steering rate, a steering acceleration of the vehicle, as well as motion parameters of the vehicle. Also, in some implementations, a driver of the vehicle 1 may determine that a lane change is to be done, in which case the computer system 1100 may receive corresponding input from the driver indicating that the lane change is about to occur. For example, a button or another control device of the vehicle may be actuated. In some examples, e.g., when the vehicle is autonomous, the driver of the vehicle may predict that an upcoming maneuver will be dangerous, which can be done before the maneuver starts or during the maneuver. If the vehicle is manually driven, the driver may also be enabled to inform the vehicle such as the computer system 1100 about an upcoming dangerous maneuver.

The computer system 1100 is arranged and configured to communicate with the electronically controlled suspension system 4 of the trailer 3 via a connection 6, shown by a dotted arrow in FIG. 1. The connection 6 may employ a CAN-based vehicle bus standard interface, an automotive Ethernet connection, or any other communication means.

The electronically controlled suspension system 4 may be a hydropneumatic suspension system, an air suspension system, or a suspension system of another time. Embodiments herein are not limited to any specific type of a suspension system of a trailer. The suspension system 4 of the trailer is a general name for force transmission connecting devices between a trailer frame and axles, and has the functions of transmitting force and moment acting between wheels and the trailer frame, buffering impact force transmitted to the trailer frame by an uneven road surface, and ensuring the smoothness of the entire vehicle. The suspension system defines bearing performance and reliability of the trailer and thus the entire vehicle combination 1.

Two or more trailers may be connected to the tractor 2. The trailer may be any type of a vehicle unit such as a trailer, a semi-trailer or semitrailer, or a dolly, and the vehicle 1 may have one or more of a trailer, a semi-trailer, or a dolly. It should be noted that any reference herein to a trailer applies to a semitrailer and a dolly, unless indicated otherwise.

While exemplified as a tractor pulling at least one trailer, the vehicle 1 may also be any other suitable vehicle which may experience instability.

Examples herein can detect or predict an instability of the vehicle 1, e.g., a tilting in any direction. When tilting or another type of instability is experienced by the tractor 2, there is some time delay before the trailer 3 will follow, and thus, an action may be taken, using the techniques herein, to avoid or limit the impact of the instability of the complete vehicle combination 1. Information regarding a current or predicted tractor instability, along with instructions to the trailer to take an action, may be sent from the tractor 2 to the trailer 3. The controllable suspension system of the trailer may be instructed to redistribute the load between the wheel axles based on the detected tractor instability state, in the manner that improves stability of the trailer and allows avoiding dangerous situations.

The instability state of the vehicle may be detected or determined or predicted using a steering angle and motion parameters of the vehicle 1. In some embodiments, the potential instability of the vehicle 1 may be detected when it is also identified that the vehicle 1 is changing lanes, which in some cases may be part of overtaking another vehicle 1. The steering angle information may for example comprise an angle and/or an angular rate, i.e. how the angle is changing over time. The motion parameters may comprise any one or more out of a speed, longitudinal velocity, longitudinal acceleration and/or lateral acceleration of the vehicle 1. Current measurements and/or parameters may be obtained in any suitable manner, e.g. by sensors of the vehicle 1 and/or may be predefined when applicable. The motion parameters may also comprise oscillations due to decreased lateral stiffness. The measured and/or predicted steering angle and motion parameters of the vehicle 1 are used to determine whether or not to adjust a load distribution between the multiple wheel axles of the trailer based on the detected tractor instability state. In some embodiments, the load is distributed such that the load is higher on a rear axle on trailer than on other axles, which has a stabilizing effect on the vehicle 1. In this way, a yaw instability of the vehicle 1 is prevented. The rear axle may comprise one or more rear or rearward axles.

In some embodiments, in situation in which the at least one trailer 3 is prepared for an evasive maneuver, the vehicle 1 can be stabilized such that a safety system e.g. the ESC system of the vehicle 1 may not be activated. The ESC system is typically arranged to maintain the stability of a vehicle, and it may monitor a yaw rate, a lateral acceleration of the vehicle, and other parameters. The ESC system may actuate one or more brakes automatically in circumstances when traction needs to be improved. Techniques in accordance with the present disclosure allow controlling the stability of the vehicle such that the vehicle is stable enough and its conditions thus do not trigger the ESC system to be activated. This advantageously allows a finer control over the vehicle 1 since, in some situations, the ESC may cause the vehicle to brake harder than desirable which may create a situation when the vehicle may be rear-ended by other vehicle on the road. At the same time, the ESC system can be activated when desirable, to further improve stability. Thus, whereas the stability control using the described approach may avoid a need to activate the ESC system in some scenarios e.g. when the vehicle 1 is turning and accelerating, the ESC system may be activated as desired, to additionally assist with maintaining the vehicle stability.

Figure 2:
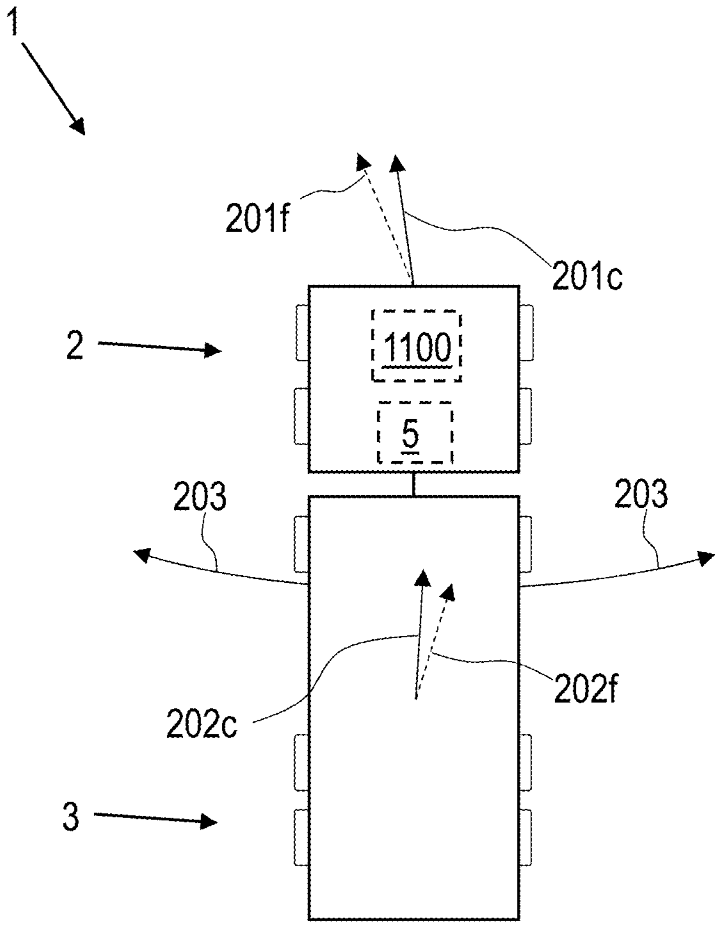
FIG. 2 illustrates another example of the vehicle of FIG. 1 in accordance with an example.

FIG. 2 is another example view of a vehicle 1, according to an example. In this example scenario, a current steering angle information and longitudinal motion of the vehicle 1 is represented as a current steering angle and longitudinal motion vector 201*c*, e.g., for the whole vehicle 1 or for the tractor 2 of the vehicle 1. In some embodiments, the current steering angle information and longitudinal motion of the vehicle 1 may further comprise a current steering angle and longitudinal motion vector 202*c* for the trailer 3. The techniques in accordance with examples herein may use a current steering angle and longitudinal motion e.g. longitudinal velocity of the vehicle 1, as well as a steering rate and steering acceleration, to determine whether to maintain a current load distribution between the axles of the at least one trailer 3 or whether to adjust or redistribute the load.

In some examples, a future or predicted steering angle information and at least one future or predicted motion parameter of the vehicle 1 may be predicted. Also, a steering rate, a steering acceleration may be predicted. The predicted steering angle information and the predicted longitudinal motion may be represented as a predicted steering angle and predicted longitudinal motion vector 201*f*, e.g., for the whole vehicle 1 or for the tractor 2 of the vehicle 1. For some embodiments the predicted steering angle information and the predicted longitudinal motion may further be represented as predicted steering angle and predicted longitudinal motion vector 202*f* for the trailer 3. The current and predicted vectors 201*c*, 201*f*, 202*c*, 202*f*, or the like, of the example may also represent lateral motions and/or yaw motions of the vehicle 1. The yaw instability may cause lateral force 203 on the vehicle 1 which may endanger the vehicle 1 and its surroundings. For example, the vehicle 1 may risk a jack-knifing or trailer swing of the at least one trailer 3.

It should be noted that FIG. 2 very schematically illustrates parameters related to operation of the vehicle 1 that can be used to detect or predict a possible instability state of the vehicle 1 in a certain situation on the road. Various types of events may cause the possible instability state of the vehicle, such as, e.g., a lane change, overtaking maneuver, braking, an evasive maneuver, a lateral maneuver, or turning by the vehicle.

In examples herein, determining the instability state of the vehicle may be performed by measuring the steering angle, a steering rate, a steering acceleration, and at least one motion parameter of the vehicle. The at least one motion parameter of the vehicle may comprise one or more of a speed, a longitudinal velocity, a lateral velocity, a yaw rate, a lateral acceleration, a longitudinal acceleration, a roll rate, a roll angle, and an articulation angle of the vehicle.

In some examples, the parameters may be determined for the vehicle, for the tractor or truck, for the at least one trailer, and/or for any combination thereof.

In some examples, the instability state of the vehicle may be determined using one or more of a steering wheel angle, a longitudinal speed, an articulation angle, a trailer roll angle, a tractor yaw rate, a tractor lateral acceleration, a trailer yaw rate, a trailer lateral acceleration, and/or any other suitable parameters.

The techniques in accordance with the present disclosure can advantageously be used in long vehicle combinations. The tractor comprises sensor systems that can detect whether the tractor is experiencing instability, e.g. tilting in any direction. In a case where tilting occurs, there is some time before the trailer will follow. Thus, there is time to take action, to avoid or limit the impact of the instability of the complete vehicle combination. For a longer vehicle combination, e.g. with several semitrailers and dollies, there would be more and more time before the trailer follows the tractor, the further to the trailer is positioned relative to the tractor. Thus, the techniques in accordance with examples herein may be used to send commands to the trailers coupled to the tractor, to adjust the trailers' suspension systems in case of various events that can undesirably affect stability of the vehicle.

In a vehicle combination, a truck or tractor may be arranged to tow two or more units, collectively referred to herein as trailers, which may comprise one or more of at least one trailer, at least one semitrailer, and at least one dolly.

Figure 3A:
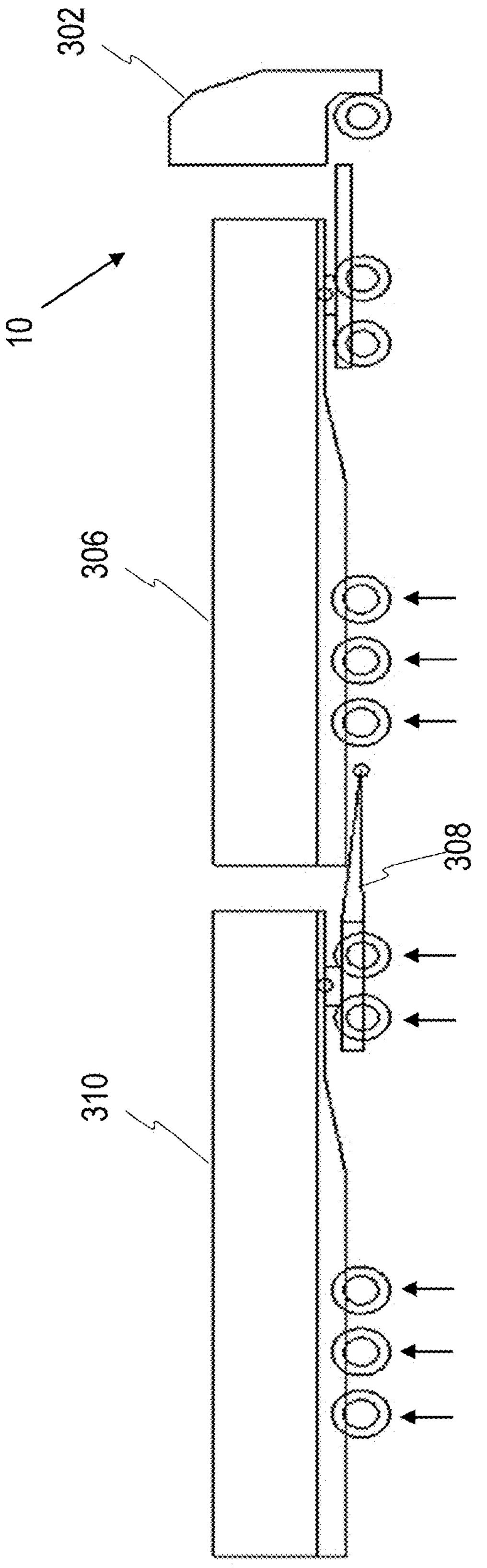
FIG. 3A illustrates a vehicle combination and a load distribution between multiple wheel axles of the vehicle in accordance with an example.
Figure 3B:
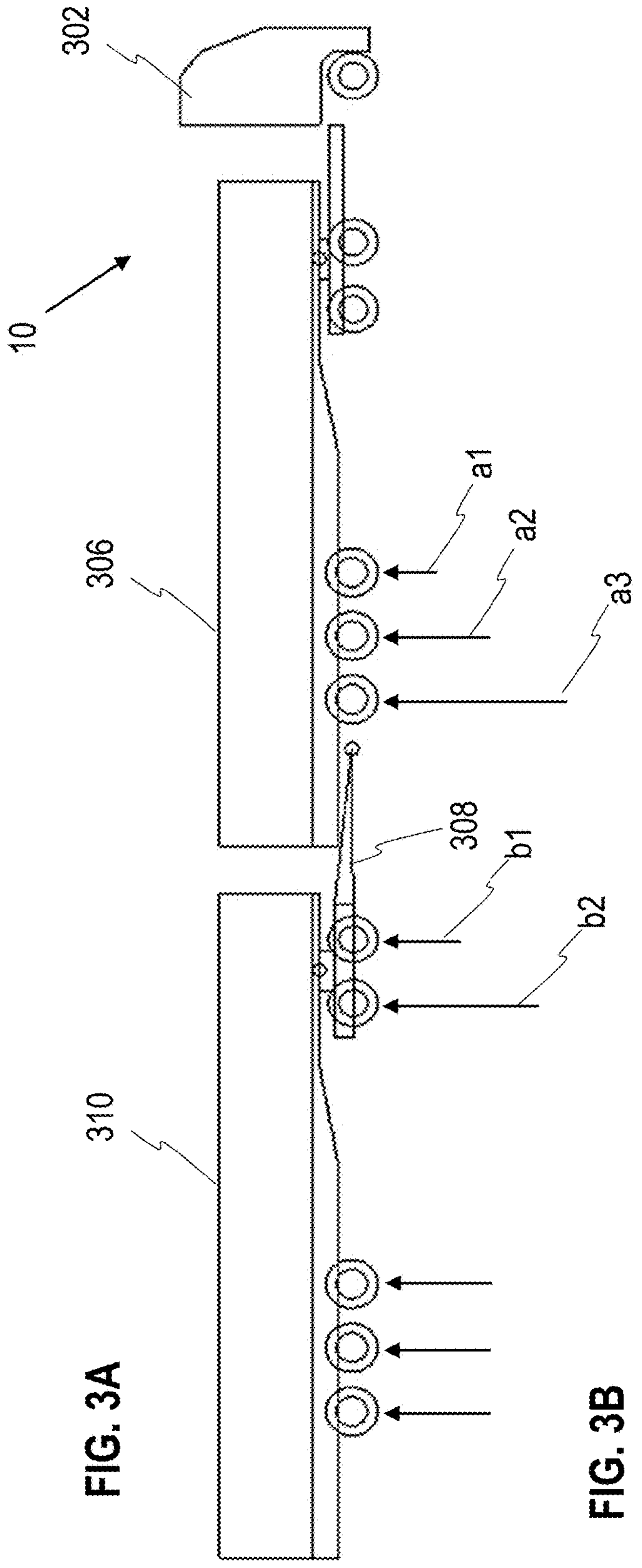
FIG. 3B illustrates the vehicle combination of FIG. 3A and a load distribution between multiple wheel axles of the vehicle in accordance with an example.

FIGS. 3A and 3B illustrate an example of a vehicle combination 10, similar to the vehicle 1. The vehicle combination 10 comprises a truck or tractor 302 and several towed vehicle attachments such as a first semitrailer 306, a dolly 308, and a second semitrailer 310. Each of the dolly 308 and the first and second semitrailers 306, 310 comprises a respective set of wheel axles, at least some of which may be controlled by a computer system in the tractor 302 (not shown) using the techniques in accordance with the present examples. As further shown in FIG. 3A by vertical arrows, the dolly 308, and the first and second semitrailers 306, 310 may have load distributed equally or approximately equally between their wheel axles. This may occur, e.g., during braking when the loads applied to the trailers' wheel axles may be equalized if all axles have the same properties in terms of braking. If braking properties of the axles are different, an increased load may be put on axles with higher braking capability.

FIG. 3B illustrates that the load can be distributed differently between wheel axles of the semitrailers and the dolly, in accordance with the techniques described herein. This is to prepare the trailer for a lane change, an overtaking another vehicle, a turn, an evasive maneuver such as e.g. swerving around an obstacle which may involve a lane change, and in other circumstances in which the vehicle deviates from a straight path. In some cases, lane change and overtaking can be evasive maneuvers or part of an evasive maneuver. Thus, as shown for the semitrailer 306 and the dolly 308 by vertical arrows a3 and b2, respectively, an increased load may be placed on their rear or rearward axles and the load on the front axle or more than one forward axles closer to the front of the vehicle may be reduced. This may decrease a rearward yaw amplification of the vehicle and thus improve stability of the vehicle.

Furthermore, as shown for the first semitrailer 306, the most load may be put on the rear-most axle of the semitrailer 306, as shown by the arrow a3, a next highest load may be put on a next rear-most, middle axle as shown by an arrow a2, and the least load may be put on a front axle as shown by an arrow a1. The load may be distributed in this way between the axles of the trailer based on a possible physical limit of the axles. In some examples, adjusting the load distribution between at least two wheel axles of a trailer comprises increasing a load on a rear-most axle of the trailer up to a possible physical limit for the rear-most axle and increasing a load on at least one next rear-most axle of the trailer up to a possible physical limit for the at least one next rear-most axle, until the load distribution is completed.

In some embodiments, when it is determined that the instability state of the vehicle is caused by the lane change by the tractor, one or more actions, that the suspension systems of the one or more trailers may be instructed to perform, may comprise one or more out of: (i) adjusting the load distribution between the at least two wheel axles such that a load on a rear axle of the trailer is increased and a load on a front axle of the trailer is decreased; (ii) lowering a height of the trailer; (iii) stiffening the controllable suspension system of the trailer; and (iv) increasing a roll damping of the trailer by using the controllable suspension system.

In examples in accordance with the present disclosure, the load distribution and one or more of the other actions that the suspension system of a trailer may be instructed to perform may be different for different trailers of the one or more trailers. For example, with reference to the vehicle 10 shown in FIGS. 3A and 3B, loads may be distributed differently between the respective wheel axles of the dolly 308 and the first and second semitrailers 306, Selection of the way in which the loads are distributed, as well as selection of other actions that may be taken to maintain or improve the vehicle stability, may depend on a roll-over tendency and/or a yaw-rate amplification, or swing-out, tendency of the vehicle 10 and/or each of the dolly 308 and the first and second semitrailers 306, 310. The vehicle is being stabilized by controlling each of the loads on each of the axles on each dolly/trailer/semitrailer. Various sensors positioned on and/or otherwise associated with the at least one trailer, and/or historical data, may be used to assess the trailer's roll-over tendency and yaw-rate amplification tendency.

In addition, in some examples, one or more towed vehicles of the at least one trailer, the at least one semitrailer, and the at least one dolly may be coupled to the truck or tractor in accordance with a speed of actuators for their respective suspension systems. Thus, the towed vehicle with the fastest actuator may be directly coupled to the truck or tractor, the towed vehicle with a next fastest actuator may be next coupled to the truck or tractor, etc. In other words, the towed vehicles may be coupled to the truck or to another trailer in the decreasing order of their suspension systems actuators. When the trailers with the faster actuators are positioned toward the front of the vehicle combination, the slower actuators positioned towards the rear of the combination will have more time to prepare for the braking or a manoeuvre.

In some aspects of the disclosure, a trailer for a vehicle combination is provided that is configured to be controlled using the method according to aspects and examples of the present disclosure. The trailer may be a trailer, a semitrailer, a dolly, or any other vehicle configured to be towed by a powered vehicle such as a tractor or a trailer. The trailer comprises an electronically controllable suspension system that is arranged and configured to be controlled by the control system according to aspects and examples of the present disclosure. The control system may be implemented e.g. as the computer system 1100 or as another suitable control system.

Figure 4A:
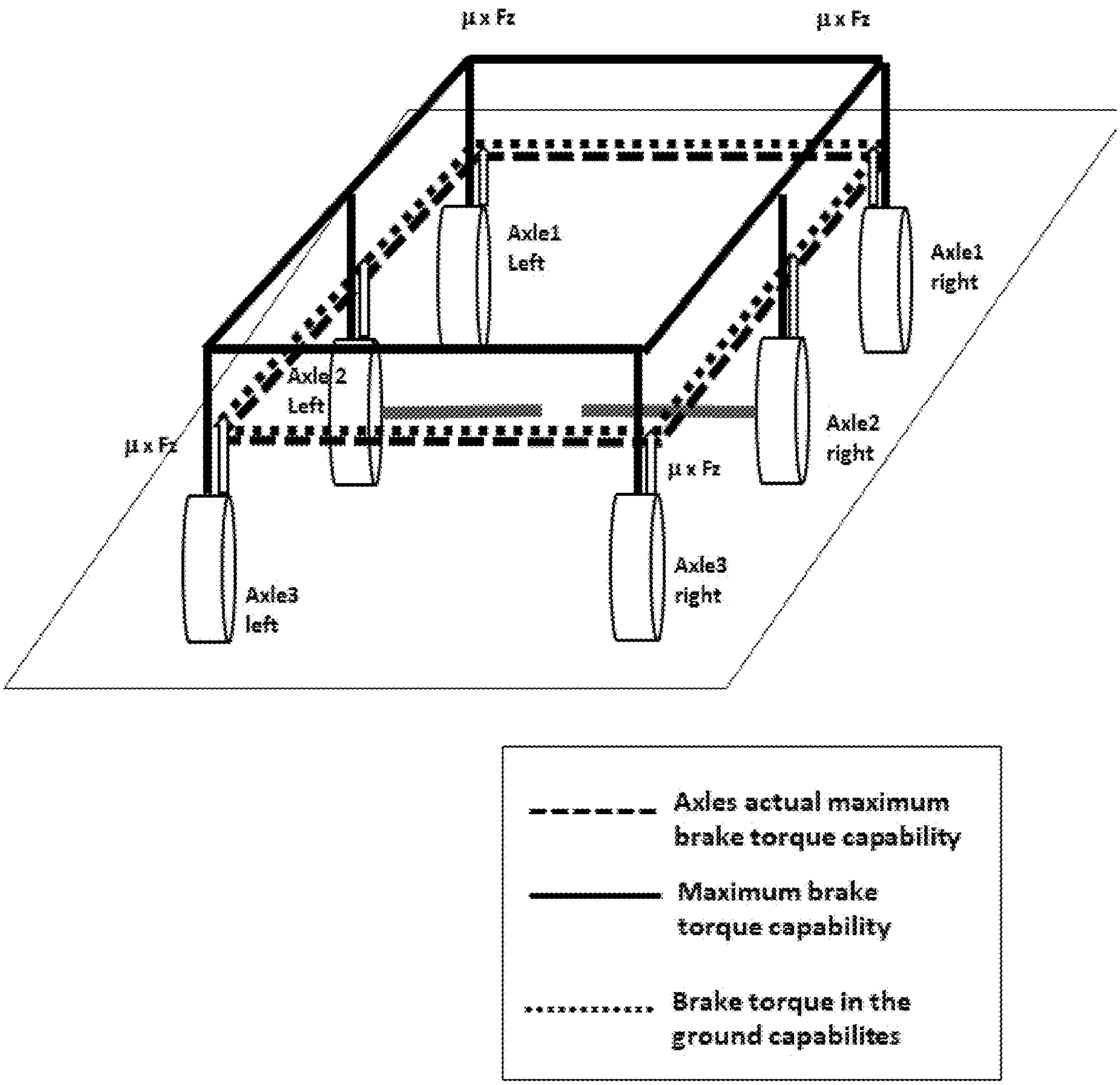
FIG. 4A illustrates a trailer with three axles, showing a load distribution, in accordance with an example.
Figure 4B:
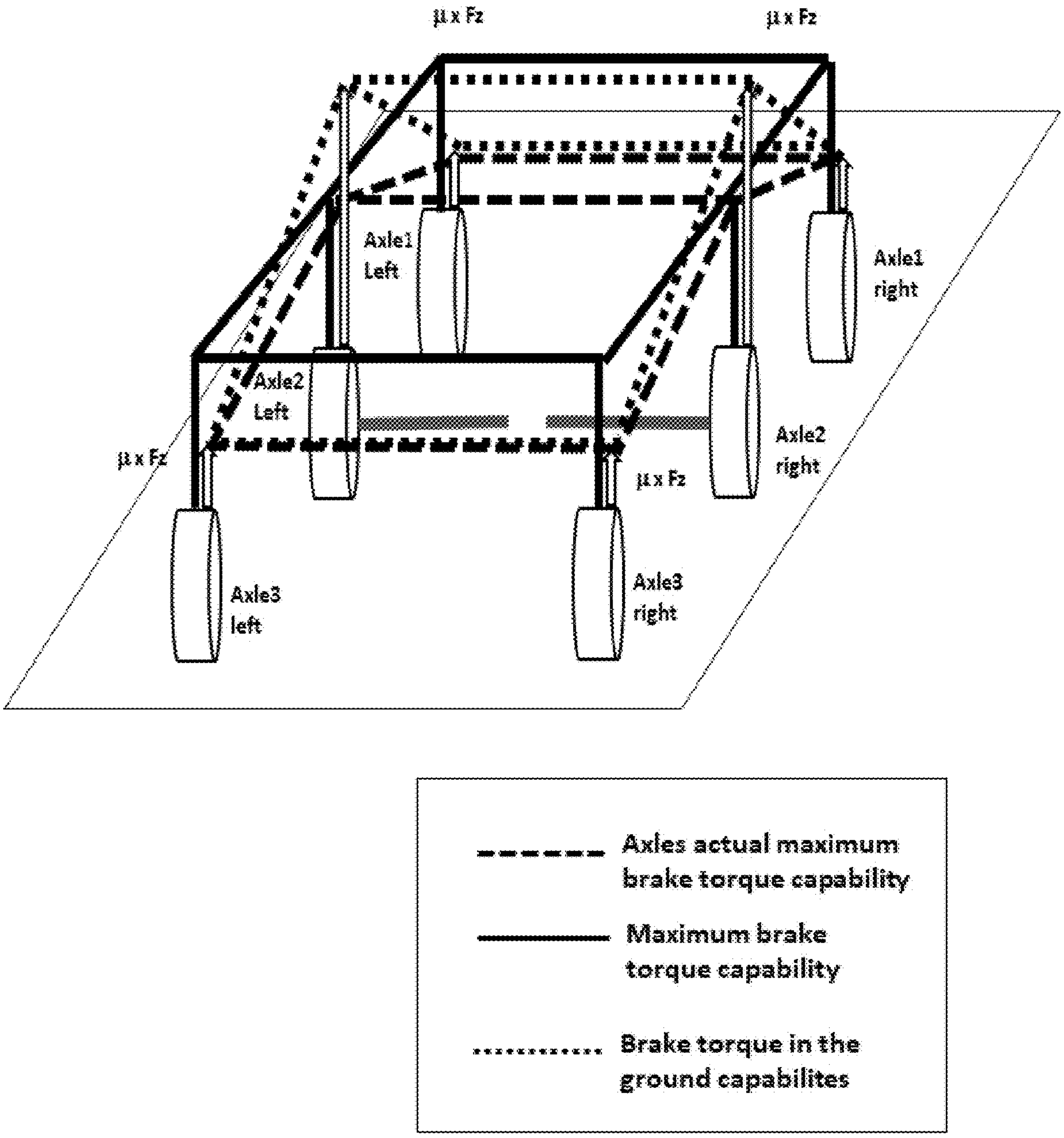
FIG. 4B illustrates the trailer of FIG. 4A, showing a load distribution that is adjusted for traction, in accordance with an example.

FIGS. 4A and 4B illustrate a trailer with three axles, showing a load distribution in what can be referred to as a normal load brake capability which is appropriate in a braking situation (FIG. 4A), and a load distribution that is adjusted for improved traction such that the traction assists with brake capability (FIG. 4B). In FIGS. 4A and 4B, a maximum brake torque capability is shown with solid lines. Dotted lines represent brake torque in the ground capabilities i.e. brake torque that can be transferred to the ground, depending on friction and normal forces. Dashed lines represent axles actual maximum brake torque capability of the trailer, which results from the capabilities shown with the solid and dotted lines.

As shown in FIG. 4B, the brake torque that can be transferred to the ground, represented by the dotted lines, exceeds the maximum brake torque capability shown by the solid lines. This indicates that the adjustment for traction is only partly useful in a braking situation, since the brake torque capability is limited by the maximum brake torque capability. The load distribution between the three axles as shown in FIG. 4B is not the most suitable for braking because an excess load is applied on a middle axle, to the extent that the maximum brake torque capability becomes limiting. Thus, for a braking event, it is desirable to distribute the axle loads on the trailer so that as much as possible of the technical brake capability can be used on all axles.

In examples herein, in case of an evasive maneuver, one of the objectives addressed in embodiments is to increase the ability of the vehicle to handle lateral acceleration such as a rollover. This may be done by increasing the roll stiffness and lowering a center of mass of the trailer. The center of mass can be lowered by decreasing a drive level.

Figure 5:
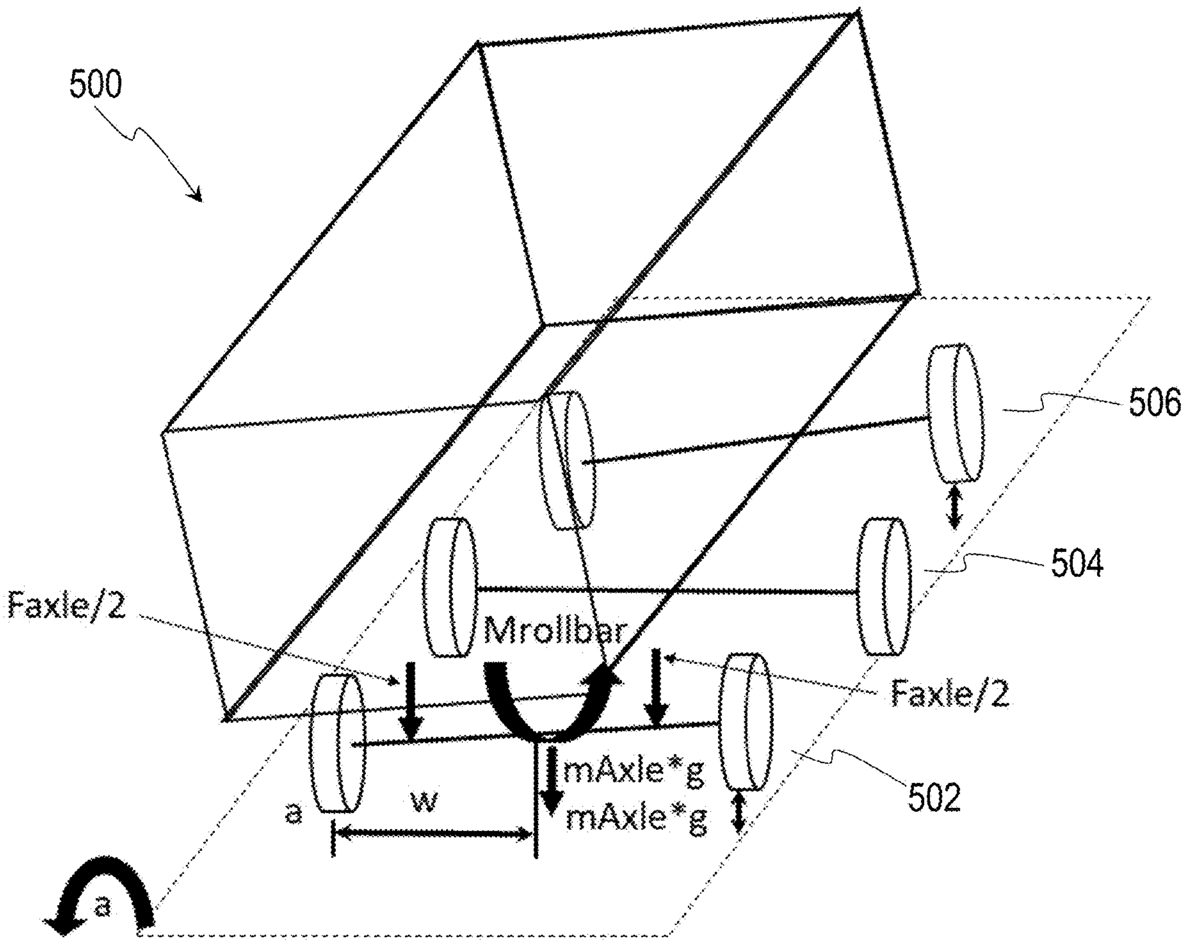
FIG. 5 illustrates an example scenario for a trailer.

FIG. 5 Illustrates an example of a trailer 500 with three axles-a front axle 502, a middle axle 504, and a rear axle 506, and the trailer 500 is shown in a position in which it is about to roll over. FIG. 5 also illustrates that a wheel lift from the ground may take place when there are different loads on each axle. FIG. 5 shows a high load on the middle axle 504, and the front and rear axles 502, 506 lifting wheels. If axle force, shown in FIG. 5, is maximized, the trailer 500 may be able to support more roll torque without rolling over. The counter-acting torque from a roll bar is proportional to the angle at which the trailer tilts. The force on the axle makes the axle press against the ground. However, if the force is too small, the axle will lift and not be able to stabilize the trailer. Actions that may be taken by a suspension system of the trailer 500 in accordance with present embodiments may decrease a likelihood of a wheel lift. Thus, if one of the axles has a higher load as compared to the other axles and a wheel lift is determined to be possible, the axle with the higher load can be stiffened by stiffening the controllable suspension system of the trailer, or a roll damping of the axle can be increased by using the controllable suspension system of the trailer, or a height of the trailer can be lowered, or the load on the high load axle may be redistributed to the other axles.

Figure 6:
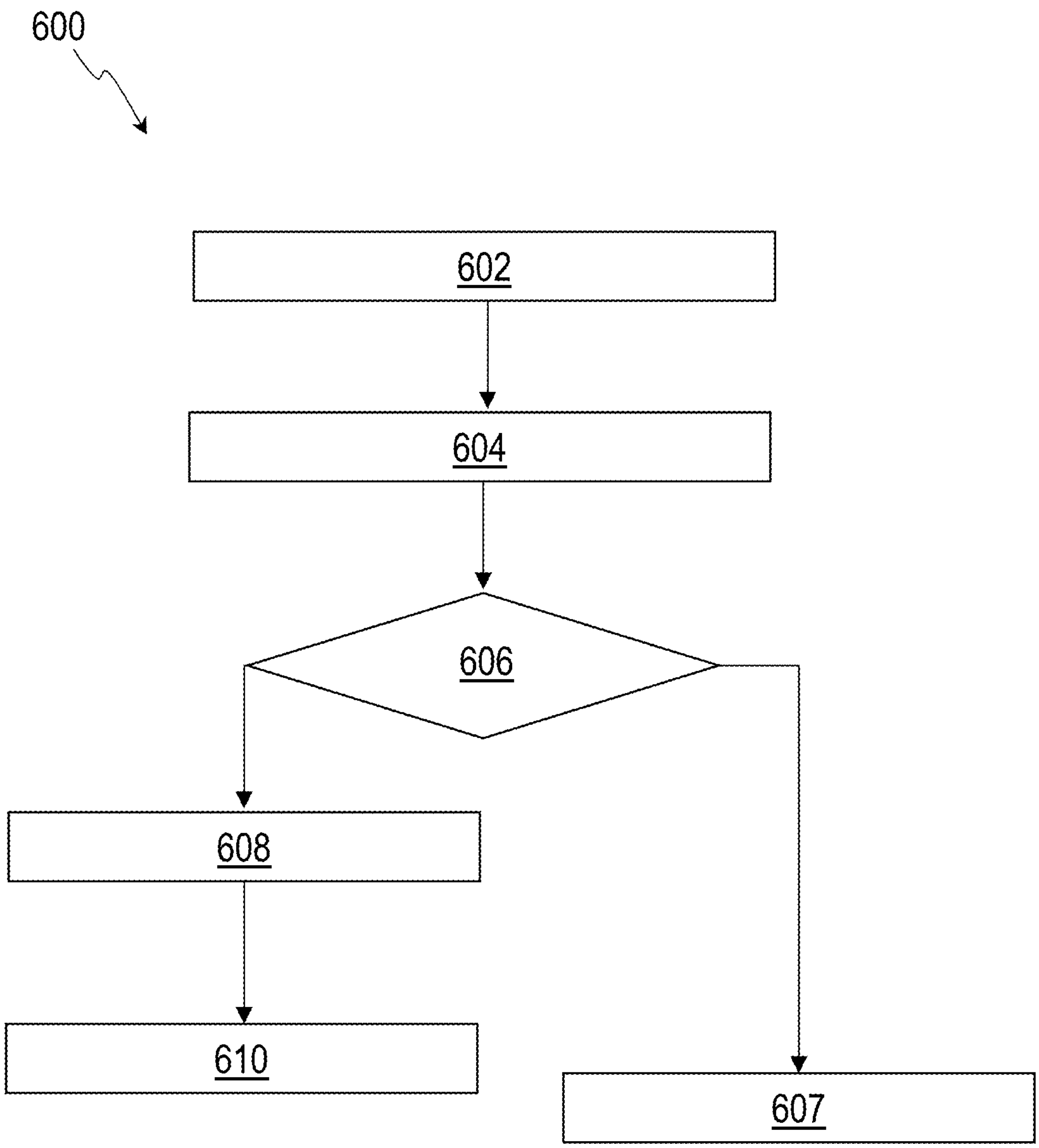
FIG. 6 is a flowchart illustrating a method in accordance with examples of the present disclosure.

FIG. 6 is a flow chart of a process or method 600 according to an example. The method 600 is a computer-implemented method for controlling stability of a vehicle comprising a truck or tractor and at least one trailer comprising at least two wheel axles and an electronically controllable suspension system. The vehicle may be vehicle 1, vehicle 10, or any other vehicle. The method comprises the following actions associated with respective blocks, which actions can be taken in any suitable order. The method actions may be performed by a processor device of a computer system such as e.g. computer system 1100 described in more detail in connection with FIG. 11. The computer system, such as a control system, is configured to communicate with the electronically controllable suspension system of the at least one trailer. As used herein, a trailer may refer to a trailer, a semitrailer, a dolly, or any other unit or vehicle configured to be pulled or towed by a powered vehicle such as the truck or tractor.

At block 602, the method 600 comprises identifying a possible instability state of the vehicle. This may be performed by using sensor data acquired by various systems e.g. a steering input system and sensors that measure operating parameters of the vehicle and the at least one trailer. The sensor data may be obtained from one or more of various sensor systems associated with the vehicle, e.g., a gyroscope/accelerometer, an image sensor such as one or more cameras, a lane sensor, an infrared sensor, a LiDAR sensor, an orientation sensor, a vehicle speed sensor, a roll sensor, a position sensor, a steering sensor, a yaw rate sensor, and/or various other sensor systems that allow determining a steering angle, a steering rate, a steering acceleration of the vehicle, as well as motion parameters of the vehicle.

The identified possible instability state of the vehicle may be detected or predicted. Thus, it may be determined that the vehicle is currently braking, turning, or performing a maneuver that may potentially affect the stability of the vehicle. When the vehicle stability is affected, the one or more trailers attached to the vehicle's tractor may articulate relative to the tractor and/or relative to another trailer.

In some examples, identifying the instability state of the vehicle may be performed by determining a steering angle, a steering rate, a steering acceleration, and a value of at least one motion parameter of the vehicle. In some examples, the at least one motion parameter of the vehicle may comprise one or more of a speed, a longitudinal velocity, a lateral velocity, a yaw rate, a lateral acceleration, a longitudinal acceleration, a roll rate, a roll angle, and an articulation angle of the vehicle. In some examples, motion estimation for the vehicle may detect oscillations due to a decreased lateral stiffness.

In some examples, wherein detecting the possible instability state of the vehicle is based on one or more out of a predicted upcoming change in operating conditions of the vehicle, road topography, traffic conditions, a predicted steering angle, a predicted steering rate, a predicted steering acceleration, and a predicted value of the at least one motion parameter of the vehicle.

The determined steering angle, steering rate, steering acceleration, and the value of the at least one motion parameter of the vehicle may be measured or predicted. The measurements may be made based on sensor data and, in some cases, based on a driver input.

Prediction of one or more of predicted or future steering angle, steering rate, steering acceleration, and a future value of the at least one motion parameter of the vehicle may be performed in various ways.

In some examples, e.g., when the vehicle is autonomous, when it starts an evasive maneuver, the vehicle will plan for a certain horizon. This knowledge can be used to know the future speed and steering angles. This can be used in both determining if the suspension load shift should be done and it can also be used to start the load shift.

In some examples, prediction models may be used for a short-term time period and a long-term time period for predicting the above parameters for the short-term time period and the long-term time period. The short-term time period is shorter than the long-term time period. The short-term time period and the long-term time period may overlap or may be distinct time intervals. The prediction models may comprise any suitable information of the vehicle and/or its driver. The prediction models may be modelled based on a behavior expected from the vehicle and/or its driver based on its respective short-term or long-term time period.

In some embodiments, predicting one or more of the future or predicted steering angle, future or predicted steering rate, future or predicted steering acceleration, and the future or predicted value of the at least one future motion parameter of the vehicle may be based on current steering angle, steering rate, steering acceleration, and a current value of the at least one motion parameter of the vehicle, as well as on historical steering angle, steering rate, steering acceleration, and a historical value of the at least one motion parameter of the vehicle. For example, a trend or delta based on both current and historical steering angle, steering rate, steering acceleration, and at least one motion parameter of the vehicle may be identified and used.

In some examples, predicting one or more of the future steering angle, steering rate, and steering acceleration information of the vehicle for a certain time period may be based on assuming that the respective values of the steering angle, steering rate, and steering acceleration for a previous time period, e.g., 1 to 2 seconds, stay the same, i.e. remain constant.

In some embodiments, predicting the future steering angle information comprises estimating a rate of change in the current steering angle information based at least partly on the historical steering angle information. The current steering rate and steering acceleration may be used to determine the future steering angle information.

In some embodiments, predicting one or more of the future steering angle, steering rate, and steering acceleration information of the vehicle and predicting the future value of the at least one motion parameter of the vehicle comprises predicting that the future steering angle, steering rate, and steering acceleration information of the vehicle and predicting the future value of the at least one motion parameter are within a respective predefined range.

In some embodiments, predicting one or more of the future steering angle, steering rate, and steering acceleration information of the vehicle and predicting the future value of the at least one motion parameter of the vehicle comprises for the long-term time period is based at least partly on road map data for one or more road segments which the vehicle is expected to drive on. The road map data may be obtained as stored from a storage medium of the computer device in the vehicle and/or may be obtained from a server external to the vehicle. The road map data may indicate any one or more out of road curvature, a friction coefficient, and/or a slope, e.g., inclination angle, for the one or more road segments.

In some embodiments, predicting one or more of the future steering angle, steering rate, and steering acceleration information of the vehicle and predicting the future value of the at least one motion parameter of the vehicle comprises for the long-term time period is based at least partly on a pre-defined behavior of the vehicle and/or based at least partly on a pre-defined behavior of a driver of the vehicle, when the vehicle is driving on the one or more road segments indicated by the road map data. For example, it may be possible to know how using the pre-defined behavior the vehicle and/or the driver of the vehicle will operate the vehicle when a certain type of turn and/or slope is part of the one or more road segments. The pre-defined behavior may be collected over time by training the prediction models, e.g., by training on data obtained from the driver driving one or more vehicles on different road segments, e.g., including or not including the vehicle, and/or training on data obtained from the vehicle driving on different road segments. When training the pre-defined behavior it may be preferable to have at least some data from driving on the one or more road segments, however, it may suffice that the training data may be from other road segments.

In some embodiments, predicting one or more of the steering angle, steering rate, and steering acceleration information of the vehicle and predicting the future value of the at least one motion parameter of the vehicle for the short-time period and/or the long-term time period comprises predicting a distance between the vehicle and a road centerline, and predicting a future vehicle orientation. In this way, by predicting the distance between the vehicle and the road centerline and the future orientation of the vehicle with respect to the road, e.g., the road centerline, it may be possible to predict the future steering angle information and the at least one motion parameter of the vehicle.

In some examples, predicting one or more of the steering angle, steering rate, and steering acceleration information of the vehicle and predicting the future value of the at least one motion parameter of the vehicle may be based on one or more of road topography, traffic conditions; predicted obstacles on the road traveled by the vehicle; ambient conditions such as a temperature, moisture level, wind, and other conditions in the area through which the vehicle travels and/or expected to travel; and/or other factors. For example, the computer system in the vehicle may acquire information from various servers or services and/or from other vehicles on the road to become aware that there is an obstacle on the road that the vehicle will need to avoid. There may be traffic-related delays such that the vehicle may be expected to slow down i.e. apply brakes at a certain part of the road. The computer system of the vehicle may be configured to be aware of other vehicles on the road, particularly those in the vicinity of the vehicle. Thus, in some cases it may be predicted that the vehicle is expected to slow down because of a slow-moving vehicle ahead. Various other scenarios are possible in which the vehicle is expected to change its speed and/or other parameters.

In some embodiments, predicting the future value of the at least one motion parameter of the vehicle comprises predicting one or more of a future speed, a future longitudinal velocity, a future lateral velocity, a future yaw rate, a future lateral acceleration, a future longitudinal acceleration, a future roll rate, a future roll angle, and a future articulation angle of the vehicle.

Any combination of the above-mentioned different future predicted parameters may be predicted at block 602.

The possible instability state of the vehicle may be identified based on detecting and/or predicting that any one or more of current and/or predicted steering angle, steering rate, and steering acceleration information of the vehicle and current and/or predicted value of the at least one motion parameter of the vehicle deviates from a certain range or is above a certain respective threshold. In some examples, e.g. in detecting and/or predicting braking of the vehicle, it may be determined that at least one motion parameter of the vehicle is below a certain threshold. Various suitable thresholds may be used. In some examples, different respective thresholds may be used for different parameters. Also, in some examples, different respective thresholds may be used for identifying different types of events that have caused a possible instability state of the vehicle.

At block 604, the method 600 comprises determining a type of an event that has caused the possible instability state of the vehicle. It should be noted that the action at block 604 may be performed as part of the action at block 602, i.e. the possible instability state of the vehicle and the type of the instability may be determined as one processing.

The possible instability state of the vehicle may be identified as an actual, detected instability state of the vehicle and/or as a predicted, upcoming instability state of the vehicle. A degree of the actual and/or predicted instability state may also be determined.

The type of an event that has caused the possible instability state of the vehicle may comprise one or more of braking, changing lanes, overtaking another vehicle, turning, and/or performing an evasive maneuver. In some examples, it may be determined that the vehicle is braking, changing lanes, overtaking another vehicle, turning, and/or performing an evasive maneuver to avoid an obstacle. Additionally or alternatively, it may be determined that the vehicle is about to brake, change lanes, overtake another vehicle, turn, and/or perform an evasive maneuver to avoid an obstacle.

The type of the event may be determined using determined steering angle, steering rate, steering acceleration, and the value of at least one motion parameter of the vehicle, wherein the at least one motion parameter of the vehicle may comprise one or more of a speed, a longitudinal velocity, a lateral velocity, a yaw rate, a lateral acceleration, a longitudinal acceleration, a roll rate, a roll angle, and an articulation angle of the vehicle.

In some examples, determining the type of the event that has caused the possible instability state of the vehicle comprises determining that the instability state of the vehicle is caused by one or more of the lane change, overtaking another vehicle, turning, and/or performing the evasive maneuver by the vehicle, by determining that one or more of the steering rate exceeds a steering rate threshold value, the steering acceleration exceeds a steering acceleration threshold value, and that the longitudinal velocity exceeds a longitudinal velocity threshold value.

At block 606, the method 600 may comprise determining whether one or more of the steering rate exceeds a steering rate threshold value, the steering acceleration exceeds a steering acceleration threshold value, and the longitudinal velocity exceeds a longitudinal velocity threshold value. Other motions parameters may be used additionally or alternatively.

The threshold values may be selected based on historical data on operations of the vehicle, vehicle operating characteristics, driver behavior data including historical driver behavior data, and other parameters that may be used to determine that the vehicle deviates or about to deviate from the path it follows in the manner that creates a risk of a dangerous situation.

In some examples, determining the type of the event that has caused the possible instability state of the vehicle comprises determining that the instability state of the vehicle is caused by a lane change by the vehicle. This may be done by determining that one or more of the steering rate exceeds the steering rate threshold value, the steering acceleration exceeds the steering acceleration threshold value, and the longitudinal velocity exceeds the longitudinal velocity threshold value. Other motions parameters may be used additionally or alternatively.

In some examples, determining the type of the event that has caused the possible instability state of the vehicle comprises determining that the instability state of the vehicle is caused by an overtaking of another vehicle, or takeover, by the vehicle. This may involve changing a current lane to another a lane and then returning to the current lane. Determining the overtaking may be done by determining that one or more of the steering rate exceeds the steering rate threshold value, the steering acceleration exceeds the steering acceleration threshold value, and the longitudinal velocity exceeds the longitudinal velocity threshold value. Other motions parameters may be used additionally or alternatively.

Various data may be used to identify an overtaking, such as e.g. how large the steering wheel change is, how high the vehicle speed is, map data of the road, lane camera signal, headway to the vehicle in front, etc.

During an overtaking, the vehicle is maneuvered to straighten the trailer out after the initial lane change. The driver would counter-steer in the opposite direction to the initial lane change. In examples herein, the suspension system of the trailer may be controlled to implement, in response to a tractor steering wheel turning rate, the load distribution or redistribution between the axles of the trailer within a time period that allows the vehicle to be straightened out. In some examples, the time period may be 2 seconds or 3 seconds. In some examples, the time period may be less than 2 seconds or less than 3 seconds.

In some examples, determining the type of the event that has caused the possible instability state of the vehicle comprises determining that the instability state of the vehicle is caused by an evasive maneuver by the vehicle. The evasive maneuver may be performed by the vehicle to avoid an obstacle e.g. another moving vehicle or a stationary obstacle on the road. This may be done by determining that one or more of the steering rate exceeds the steering rate threshold value, the steering acceleration exceeds the steering acceleration threshold value, and the longitudinal velocity exceeds the longitudinal velocity threshold value. Other motions parameters may be used additionally or alternatively.

In some cases, the evasive maneuver in some cases may involve one or more of a lane change, overtaking, braking, and turning. Accordingly, in some examples, an evasive maneuver may be identified by additionally identifying one or more of the lane change, overtaking, braking, and turning.

In some examples, determining the type of the event that has caused the possible instability state of the vehicle comprises determining that the instability state of the vehicle is caused by braking of the vehicle. This may be done by determining that the longitudinal velocity is below a second longitudinal velocity threshold. It should be noted that the second longitudinal velocity threshold, used to determine that the vehicle is slowing done, may be different from the longitudinal velocity threshold used to determine that the vehicle is changing lanes, overtaking, or performing an evasive maneuver. For example, in some cases, the second longitudinal velocity threshold may be lower than the longitudinal velocity threshold used to determine that the vehicle is changing lanes, overtaking, or performing an evasive maneuver.

In some examples, determining that the vehicle is turning may be done by determining that one or more of the steering rate exceeds the steering rate threshold value, the steering acceleration exceeds the steering acceleration threshold value, and the longitudinal velocity is above the longitudinal velocity threshold value. Other motions parameters may be used additionally or alternatively.

In some examples, determining that the vehicle is turning may be done by determining that one or more of the steering rate exceeds the steering rate threshold value, the steering acceleration exceeds the steering acceleration threshold value, and the longitudinal velocity is above the second longitudinal velocity threshold. Other motions parameters may be used additionally or alternatively. Also, a longitudinal velocity threshold value other than the second longitudinal velocity threshold may be used. For example, in some cases a turn may be determined e.g. detected or predicted by determining that that one or more of the steering rate exceeds the steering rate threshold value, the steering acceleration exceeds the steering acceleration threshold value, and the longitudinal velocity is above a third longitudinal velocity threshold. The third longitudinal velocity threshold may be different from the longitudinal velocity threshold and the second longitudinal velocity threshold.

At block 607, the method 600 may comprise determining that a current load distribution between the wheel axles of the at least one trailer of the vehicle may be maintained. It thus may be decided that no adjustment or redistribution of the load is required. This may be done in response to determining that one or more of the steering rate exceeds the steering rate threshold value, the steering acceleration exceeds the steering acceleration threshold value, and the longitudinal velocity exceeds the longitudinal velocity threshold value. This may also be done in response to determining that the longitudinal velocity is below the second the longitudinal velocity threshold value i.e. the vehicle is braking. Other vehicle motions parameters may be used additionally or alternatively to determine that there is no need to adjust the current load distribution in the trailer. It may similarly be determined that no other preventative or corrective actions may need to be taken by the suspension system of the at least one trailer.

At block 608, the method 600 comprises determining one or more actions comprising adjusting a load distribution between the at least two wheel axles of the trailer based on the possible instability state of the vehicle and based on the type of the event that has caused the possible instability state of the vehicle. This may be done in response to determining that one or more of the steering rate exceeds the steering rate threshold value, the steering acceleration exceeds the steering acceleration threshold value, and the longitudinal velocity exceeds the longitudinal velocity threshold value.

It may thus be determined that the possible instability state of the vehicle is detected that is of the type that requires one or more actions to be taken.

In some examples, when it is determined that the instability state is caused by one or more of the lane change, overtaking another vehicle, turning, and/or performing the evasive maneuver by the vehicle, the one or more actions comprise one or more out of:

(i) adjusting the load distribution between the at least two wheel axles such that a load on a rear axle of the trailer is increased and a load on a front axle of the trailer is decreased;
(ii) lowering a height of the trailer;
(iii) stiffening the controllable suspension system of the trailer; and
(iv) increasing a roll damping of the trailer by using the controllable suspension system.

Adjusting (i) the load distribution between the at least two wheel axles, such that the load on the rear axle of the trailer is increased and the load on a front axle of the trailer is decreased, decreases a rearward yaw amplification, or the amplification of the yaw rate, of the vehicle. Shifting the load from the forward axles to the rearward axles allows decreasing the amplification of the yaw rate of the vehicle which improves the stability of the vehicle. In addition, this may avoid the ESC becoming activated. As discussed above, this may be an advantage in some cases, as the ESC may not contribute to the stability of the vehicle in some evasive manoeuvres.

One or more of the lowering (ii) the height of the trailer, stiffening (iii) the controllable suspension system of the trailer, and increasing (iv) the roll damping of the trailer by using the controllable suspension system decrease the chance of the vehicle roll-over.

In some examples, the method 600 comprises, by the processor device, selecting one or more actions out of the actions (i) to (iv) based on predicting a roll-over of the vehicle and/or predicting a swing-out of the vehicle. In other words, a combination of the actions (i) to (iv) may be determined, for a trailer, based on how likely the vehicle is to roll-over versus how likely the vehicle is to swing-out. The tendency of the vehicle to roll-over and/or swing-out may be determined based on one or more of sensor data, historical data on previous evasive maneuvers performed by the same and/or other vehicles, historical data on previous standard maneuvers performed by the same and/or other vehicles, and based on other information. For example, one or more yaw rate sensors, one or more roll sensors/suspension sensors, and other sensors may be used to determine the yaw rate amplification of the vehicle and the tendency of the vehicle to roll-over. It may be determined whether the vehicle has a roll-over tendency and/or yaw-rate amplification tendency, and this information may be used to determine how the suspension system of the trailer is control throughout a maneuver.

For a long vehicle combination, such as a vehicle comprising two or more trailers such as one or more of a trailer, a semitrailer, and a dolly, one or more actions of the actions (i) to (iv) may be different. Thus, in some examples, when the at least one trailer comprises two or more trailers, the method comprises selecting one or more different combinations of actions out of the actions (i) to (iv) for respective trailers of the two or more trailers. For example, a controllable suspension system of one of the trailers coupled to the tractor may be controlled to distribute load so as to decrease the rearward yaw amplification of the vehicle, whereas a controllable suspension system of another one of the trailers coupled to the tractor may be controlled to performs one or more of the actions (ii)-(iv) to decrease the chance of the vehicle rollover.

In some examples, adjusting the load distribution between the at least two wheel axles of a trailer of the two or more trailers comprises increasing a load on a rear axle of the trailer of the two or more trailers. This advantageously allows decreasing yaw amplification of the vehicle.

In some examples, adjusting the load distribution between the at least two wheel axles of a trailer of the two or more trailers comprises increasing a load on a rear-most axle of the trailer of the two or more trailers up to a possible physical limit for the rear-most axle and increasing a load on at least one next rear-most axle of the trailer of the two or more trailers up to a possible physical limit for the at least one next rear-most axle, until the load distribution is completed. Thus, the load may first be increased on the rear-most axle of the trailer up to a physical limit of the rear-most axle. The load may also be increased on a next rear-most axle up to a physical limit of the next rear-most axle. The load may further be increased on other one or more axles, to a degree up to their respective possible physical limits. Thus, the entire load applied to the multiple wheel axles of the trailer may be redistributed between the axles depending on how close the axle is to the front of the vehicle, such that the load on the axles positioned farther from the tractor is higher than the load on the wheel axles that are closer to the front of the vehicle.

In some examples, determining the one or more actions, comprising adjusting the load distribution between the at least two wheel axles, may be performed based on a yaw rate amplification of the vehicle and/or the at least one trailer. Knowledge of the yaw rate amplification allows determining the limits for load distribution control to be conducted or how the load distribution should be performed. The at least one trailer may comprise one or more yaw rate sensors that can acquire measurements used to determine how much amplification is occurring for the vehicle combination under non-emergency manoeuvres.

In some examples, when it is determined that the instability state is caused by a braking of the tractor, the one or more actions comprise adjusting the load distribution between the at least two wheel axles based on a braking capability of each wheel axle of the at least two wheel axles and/or based on a braking capability of the trailer. The braking capability may depend e.g. on type(s) of tires and other factors. In some examples, when it is determined that the instability state is caused by a braking of the tractor, the one or more actions comprise adjusting the load distribution between the at least two wheel axles of the trailer by equalizing loads between the axles. This may be done when all axles have the same properties in terms of braking. If the braking properties of the trailer axles are different, higher load may be put on the axles with higher braking capability.

In some examples, the load may not be equally distributed between the at least two wheel axles of the trailer when there is one axle providing traction in which case a higher load may be placed on that axle. In some examples, the load may not be equally distributed between the at least two wheel axles of the trailer when the front axle of the trailer e.g. a semitrailer may have a higher load placed on it, in order to decrease the load that is on the rear of the tractor.

At block 610, the method 600 comprises generating and sending a control command to the suspension system of the at least one trailer to perform the one or more actions. The control command, along with any relevant information, may be sent to the at least one trailer through added signals on a standard interface, such as e.g. a CAN-based vehicle bus standard, via an automotive Ethernet connection, or via any other suitable connection. When the at least one trailer comprises two or more trailers comprising respective controllable suspension systems, a separate command may be generated and sent to the suspension systems of each of the individual trailers.

The method 600 in accordance with the present disclosure allows distributing the load between the axles of the trailer relatively quickly, to avoid or mitigate a dangerous situation on the road due to the vehicle potentially losing its stability. The load distribution from a second trailer axle, if this is the one with the highest load, can be prioritized in some cases.

FIGS. 7A, 7B, 8A, 8B, 9A, 9B, 10A, and 10B illustrate results of tests and simulations in which an axle load of a trailer of a combination vehicle, comprising a tractor and a trailer with three wheel axles of a controllable suspension system, was adjusted to reduce a yaw rate in a lane change maneuver. It should be noted that all illustrated values are examples only. The numerical references 013, 111 and 310 represent separate combination vehicles, with different ratios of axle loads on wheel axles of the trailer, in order from the front to the rear of the trailer. The numerical reference 013 represents the vehicle, actual or simulated, in which stability is controlled in accordance with examples of the present disclosure. The numerical references 111 and 310 represent respective vehicles, actual or simulated, which are controlled in a conventional manner. Thus, in the vehicle 310, more load is placed, actually or in a simulated manner, on the front axle of the trailer.

Figure 7A:
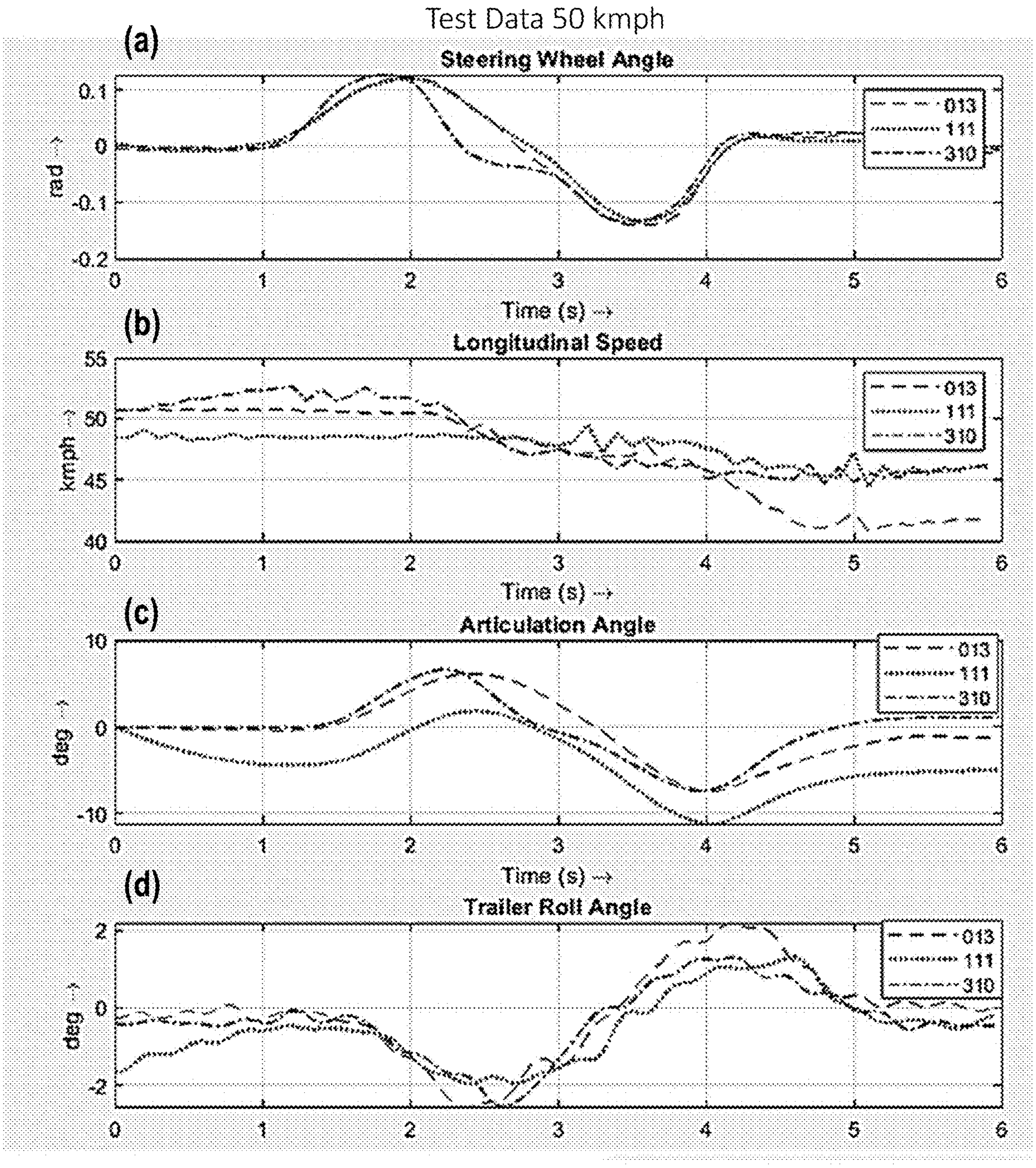
FIGS. 7A, 7B, 8A, 8B, 9A, 9B, 10A, and 10B illustrate results of tests and simulations in which an axle load of a trailer of a combination vehicle was adjusted to reduce a yaw rate in a lane change maneuver.
Figure 7B:
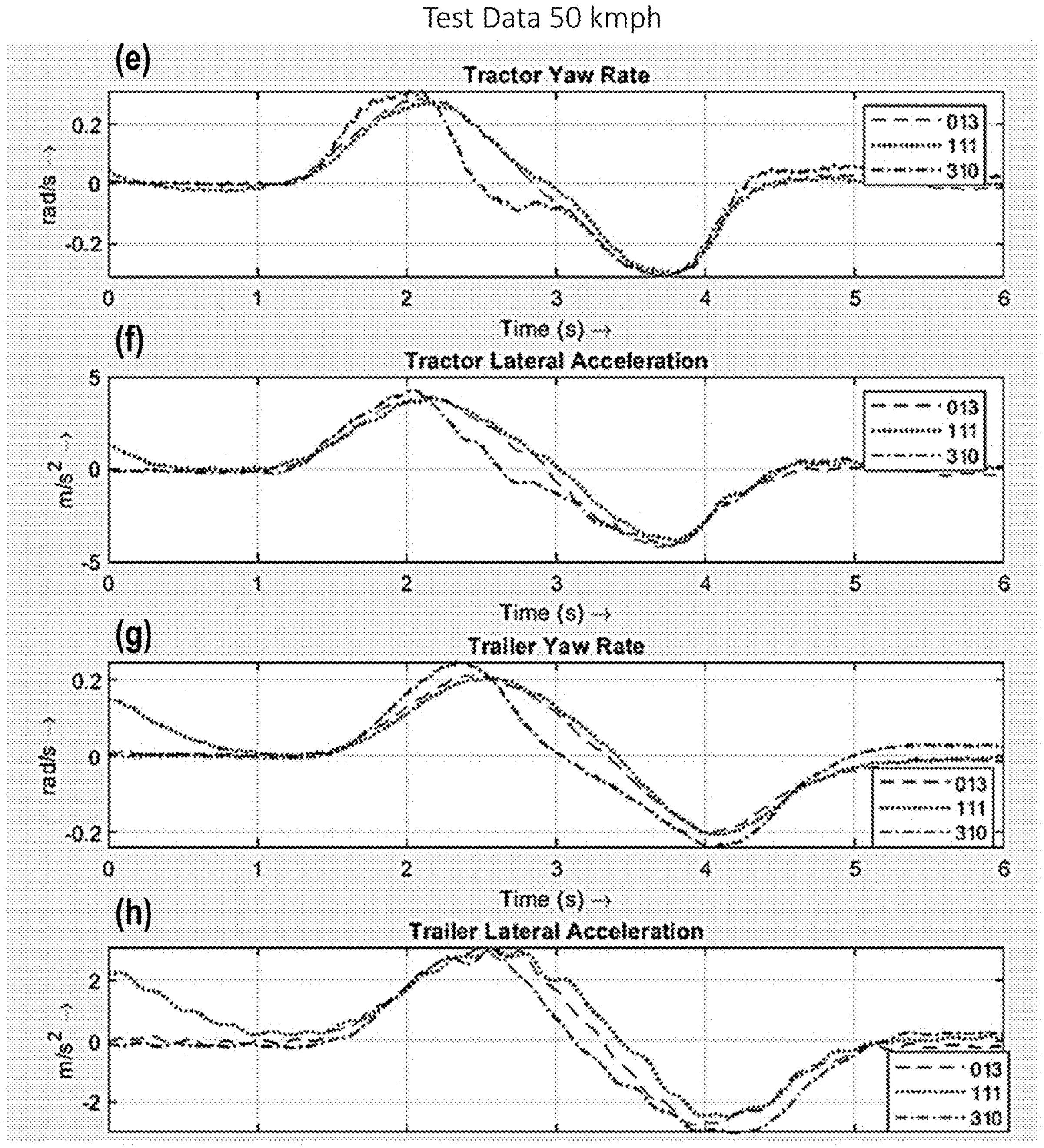
Figure 8A:
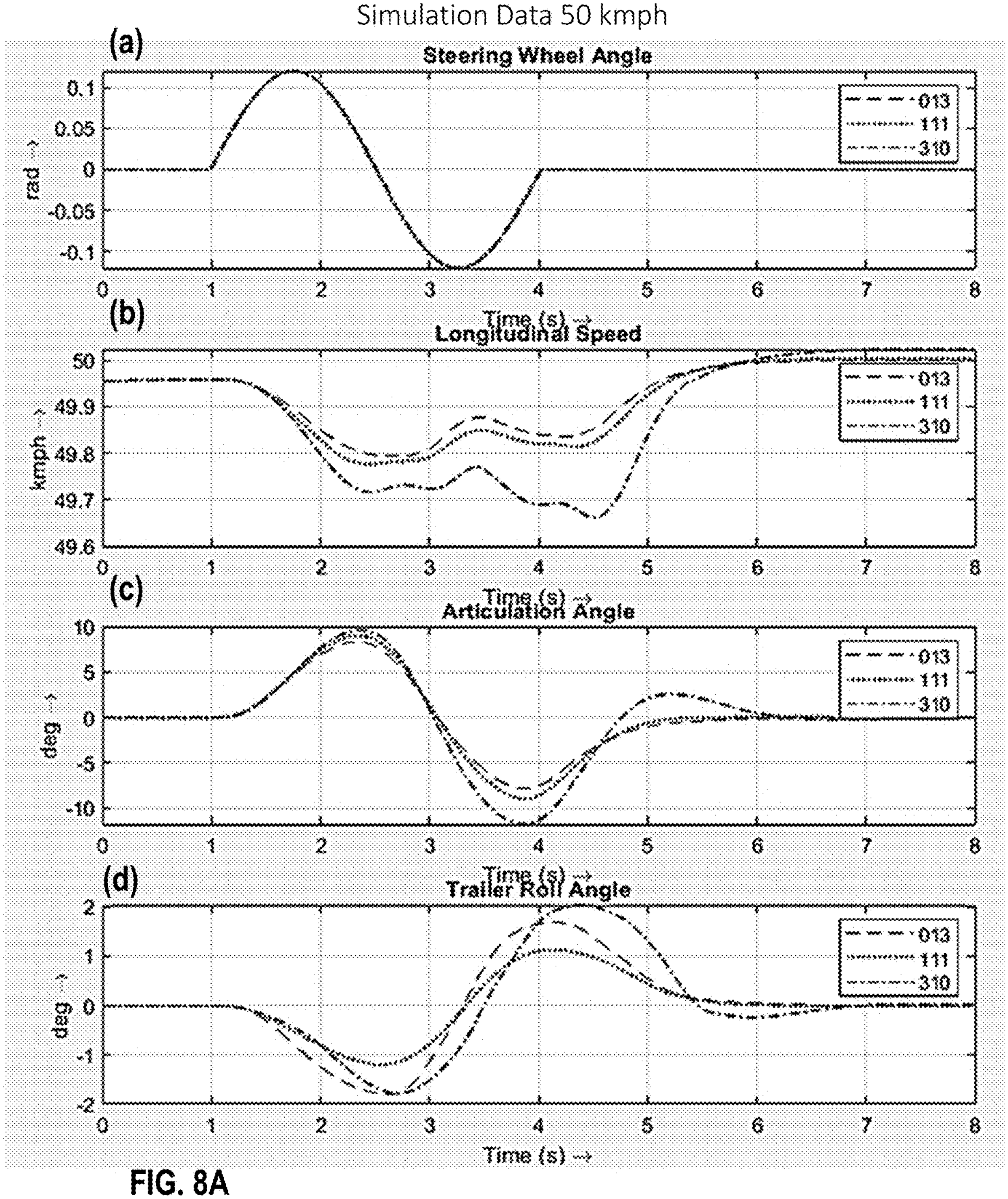
Figure 8B:
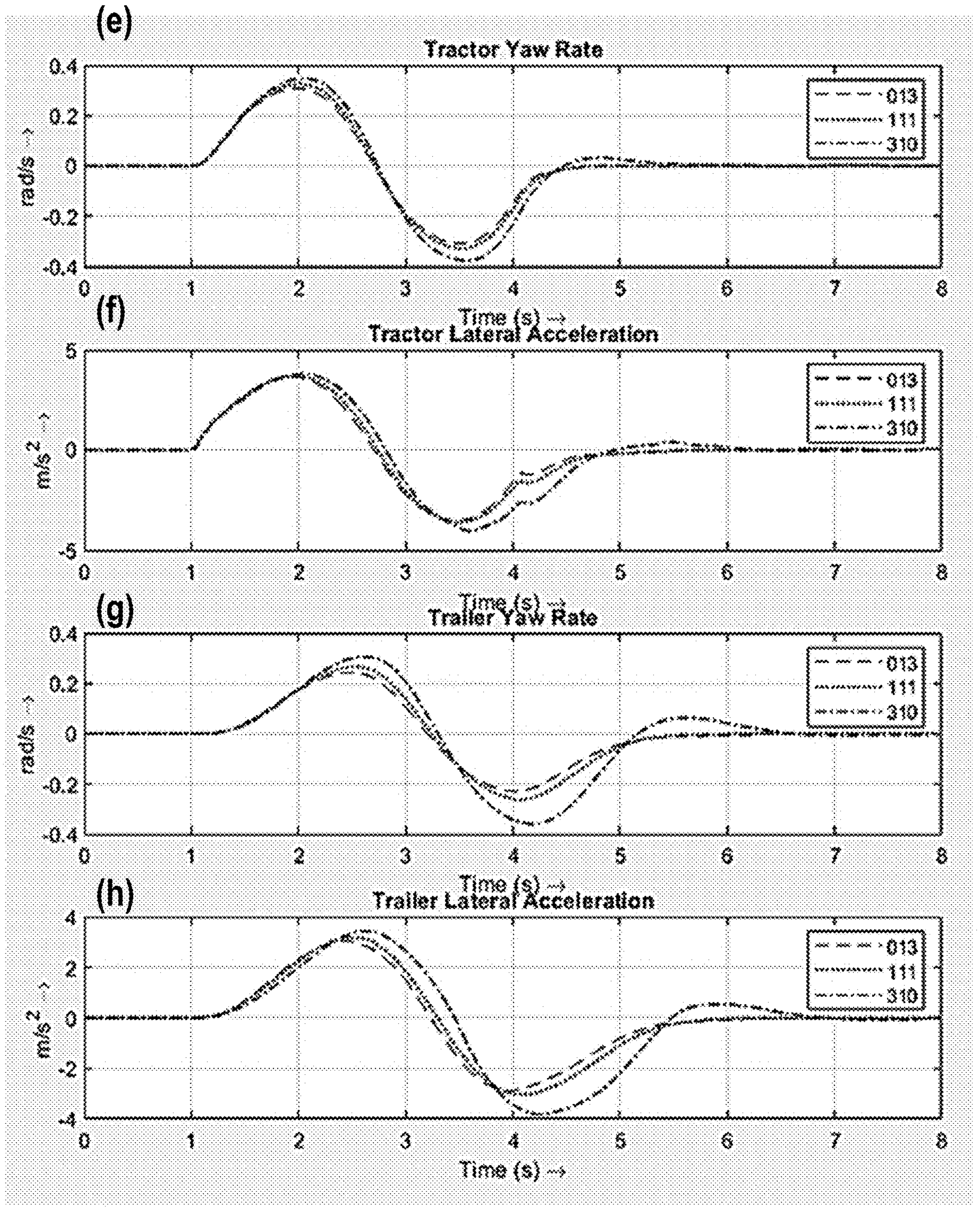
Figure 9A:
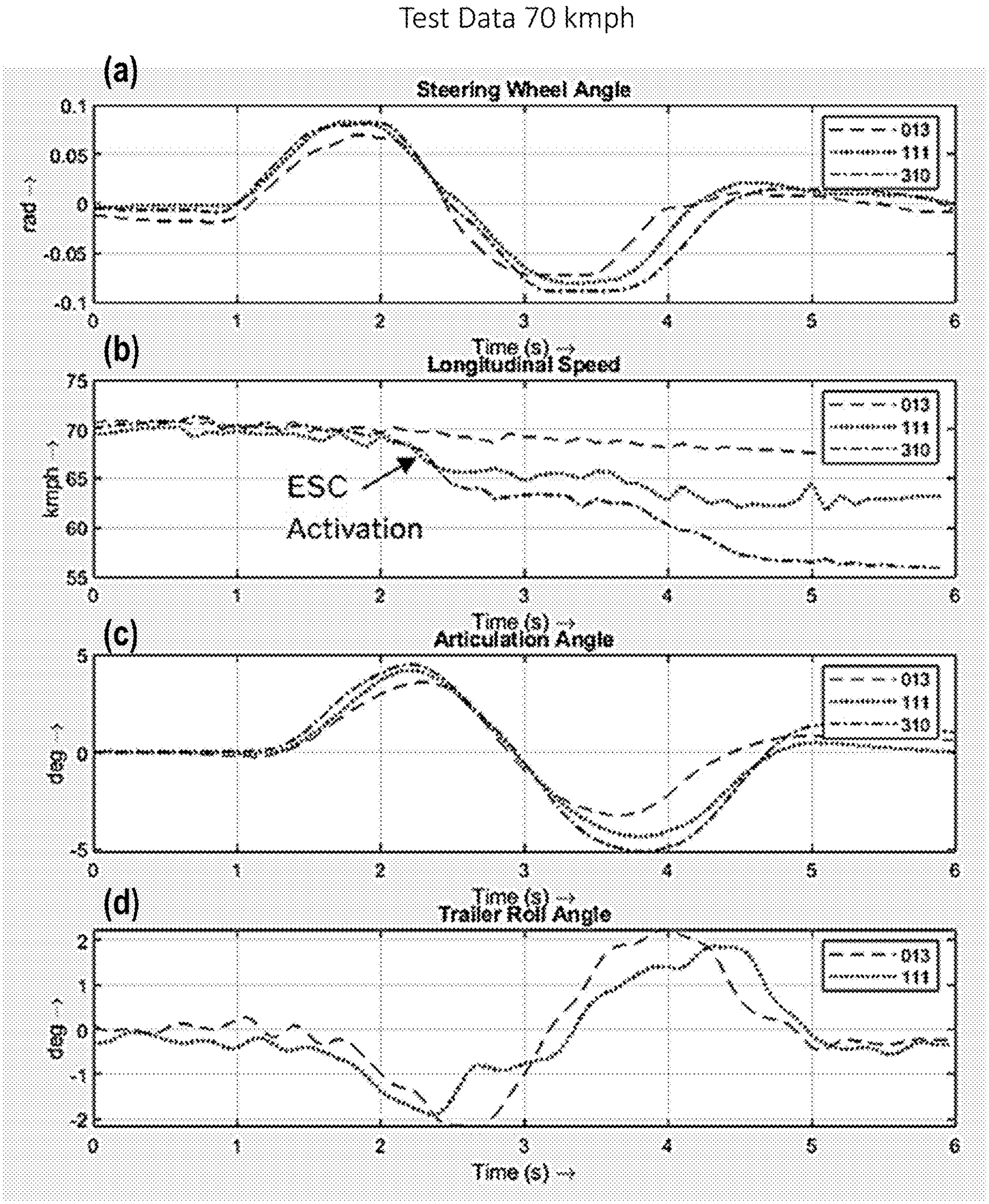
Figure 9B:
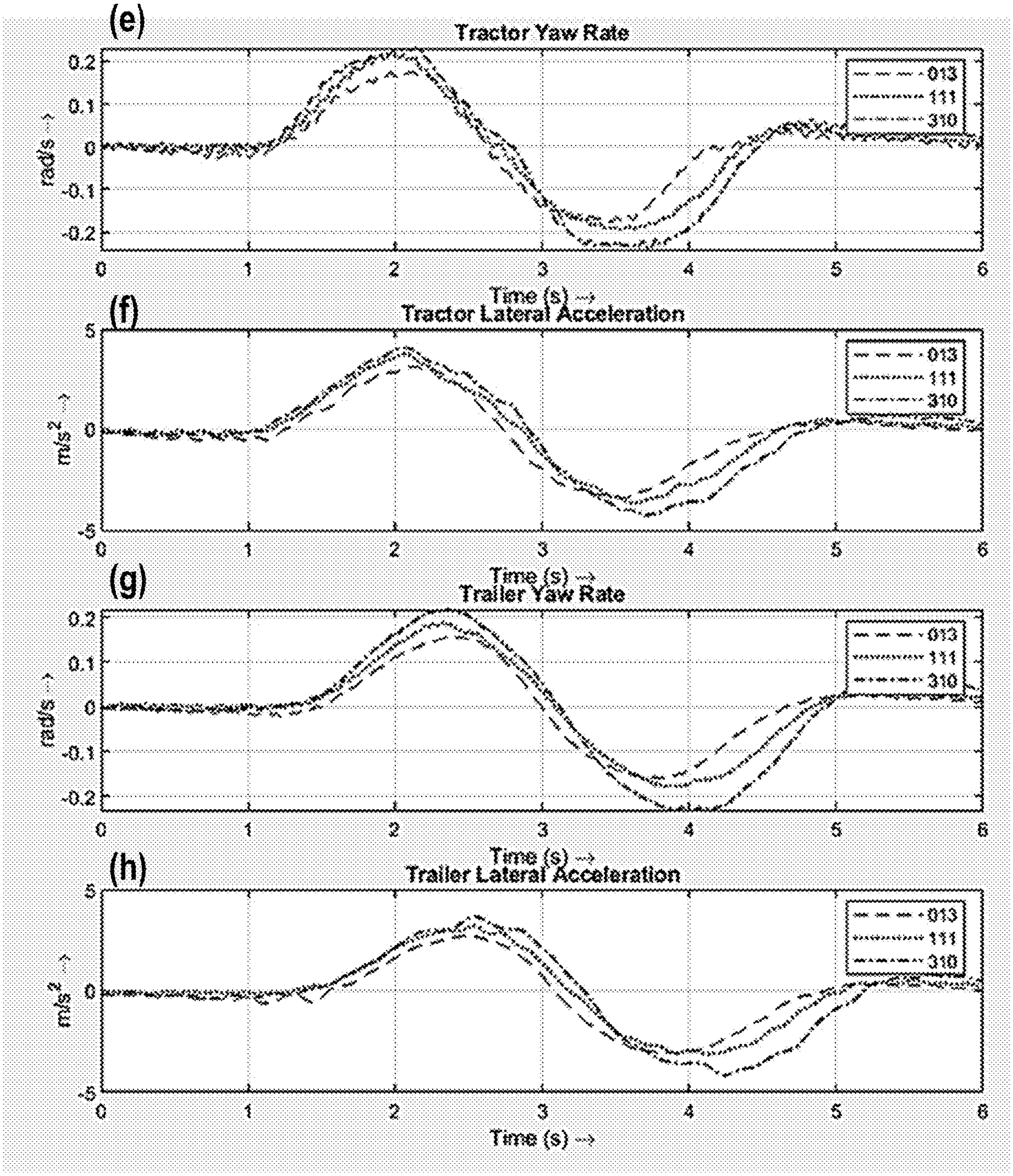
Figure 10A:
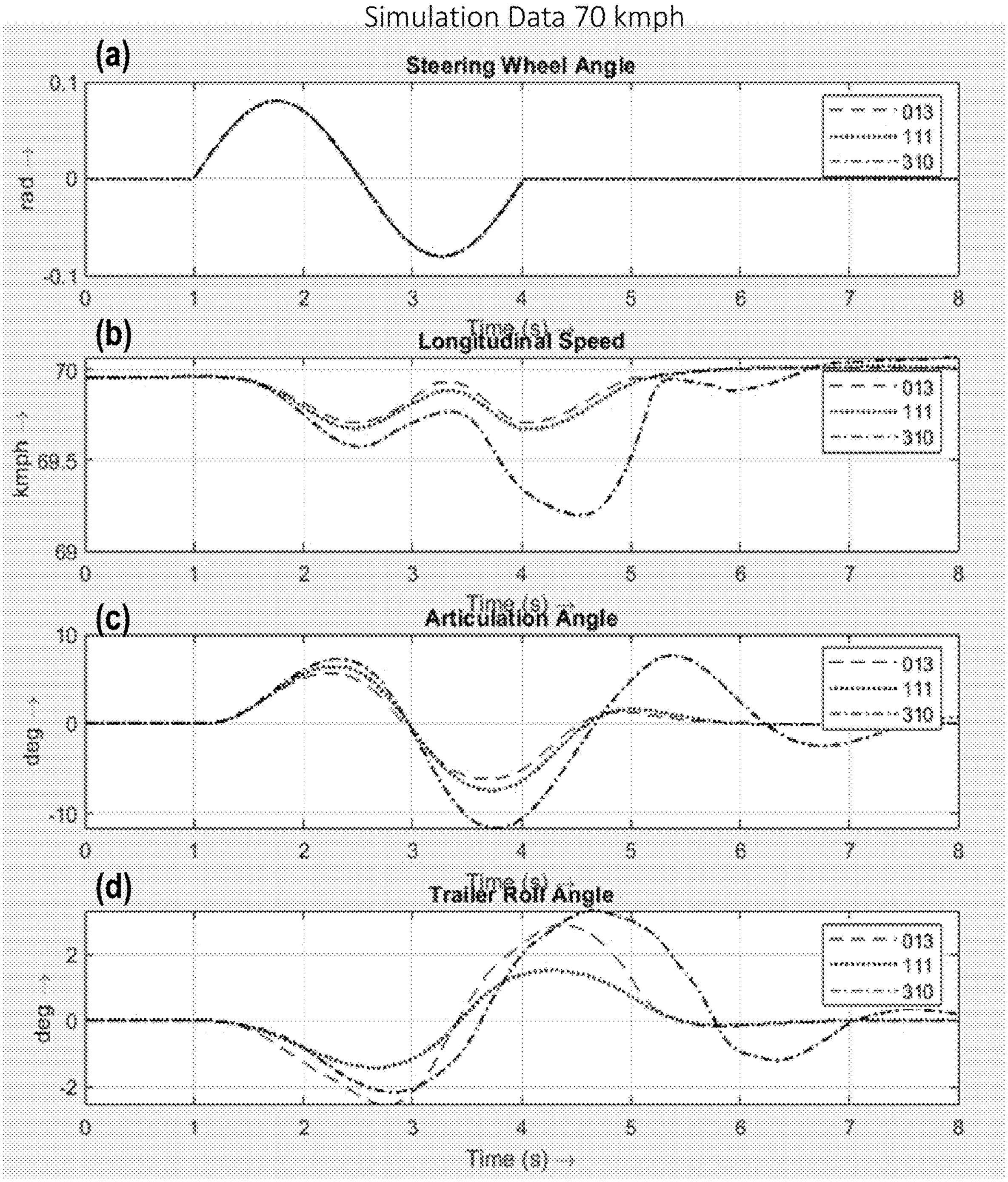
Figure 10B:
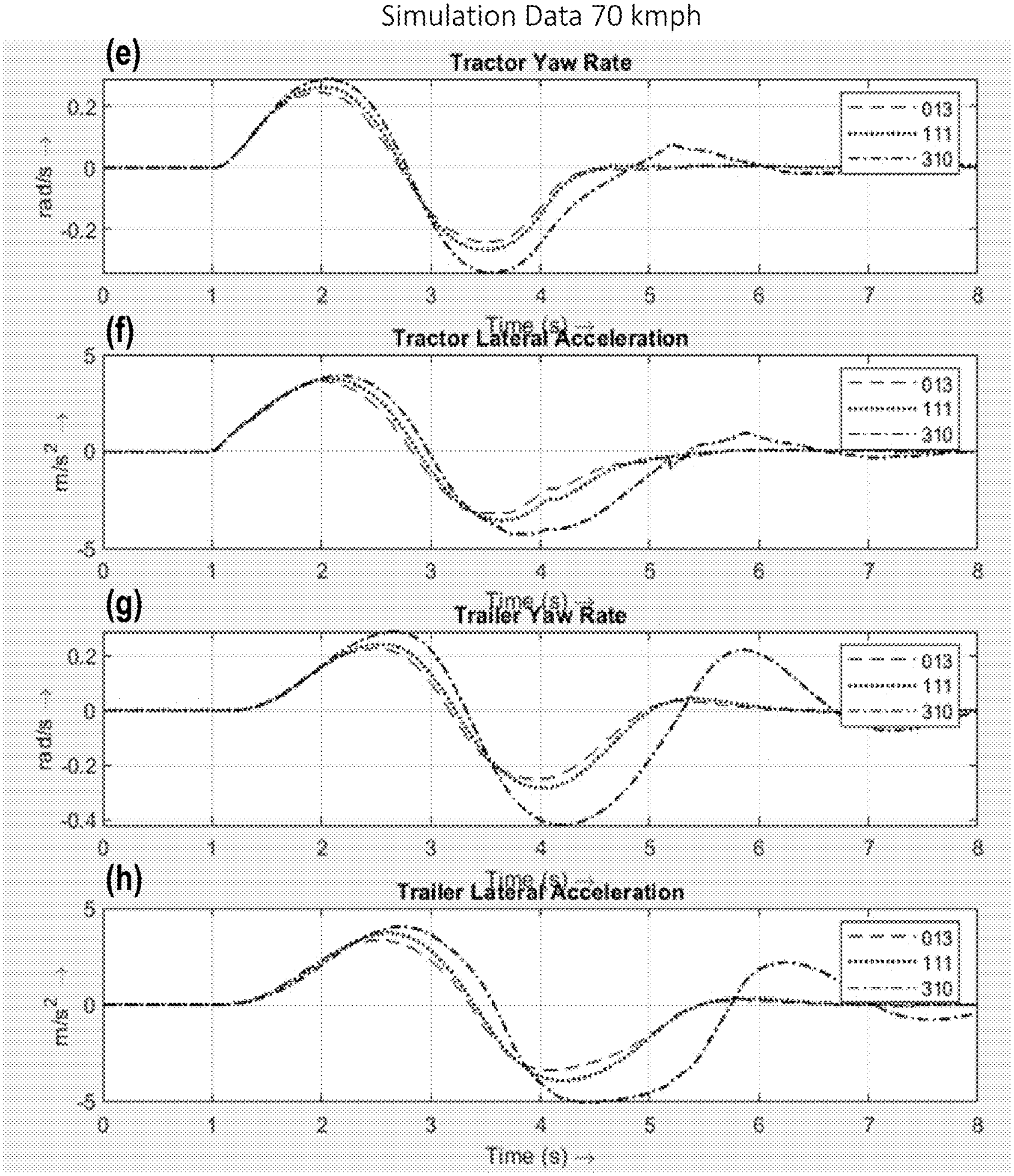

Each of FIGS. 7A, 7B, 8A, 8B, 9A, 9B, 10A, and 10B illustrates data for the following parameters: (a) a steering wheel angle, (b) a longitudinal speed, (c) an articulation angle, (d) a trailer roll angle, (c) a tractor yaw rate, (f) a tractor lateral acceleration, (g) a trailer yaw rate, and (h) a trailer lateral acceleration. The values of these parameters are plotted as a function of time, in seconds. The values illustrate the vehicle performance during a lane change maneuver. FIGS. 7A and 7B illustrate test results for the actual vehicle moving at a speed of 50 kmph, FIGS. 8A and 8B illustrate results for the simulation of a vehicle moving at a speed of 50 kmph, FIGS. 9A and 9B illustrate test results for the actual vehicle moving at a speed of 70 kmph, and FIGS. 10A and 10B illustrate results for the simulation of a vehicle moving at a speed of 70 kmph.

The results shown in FIGS. 7A, 7B, 8A, 8B, 9A, 9B, 10A, and 10B demonstrate that, for both the tractor and trailer of the vehicle combination, the yaw rates, lateral acceleration and the articulation angle are lower when the load is shifted to the rear axle of the trailer from the forward axles. The trailer slides less laterally and is more stable during a second half of the lane change maneuver when the load is shifted to the rear axle of the trailer from the forward axles.

A sudden decline in the longitudinal speed, as shown in FIG. 9A, indicates the ESC system activation. At the same time, for the vehicle 013, as also shown in FIG. 9A, it is observed that the ESC system activation may be inhibited for the same speed of the lane change maneuver when the load is shifted to the rear axle of the trailer from the forward axles.

It may be concluded that, in the examples of FIGS. 7A, 7B, 8A, 8B, 9A, 9B, 10A, and 10B, in order to reduce a roll angle of the trailer during the lane change, all three axles of the trailer should be equally loaded. In may also be concluded that, by analysing the steering input, a nature of the maneuver can be predicted and the suspension system of the trailer can be setup accordingly, with the goal to either to improve a roll stability or improve a yaw stability.

Figure 11:
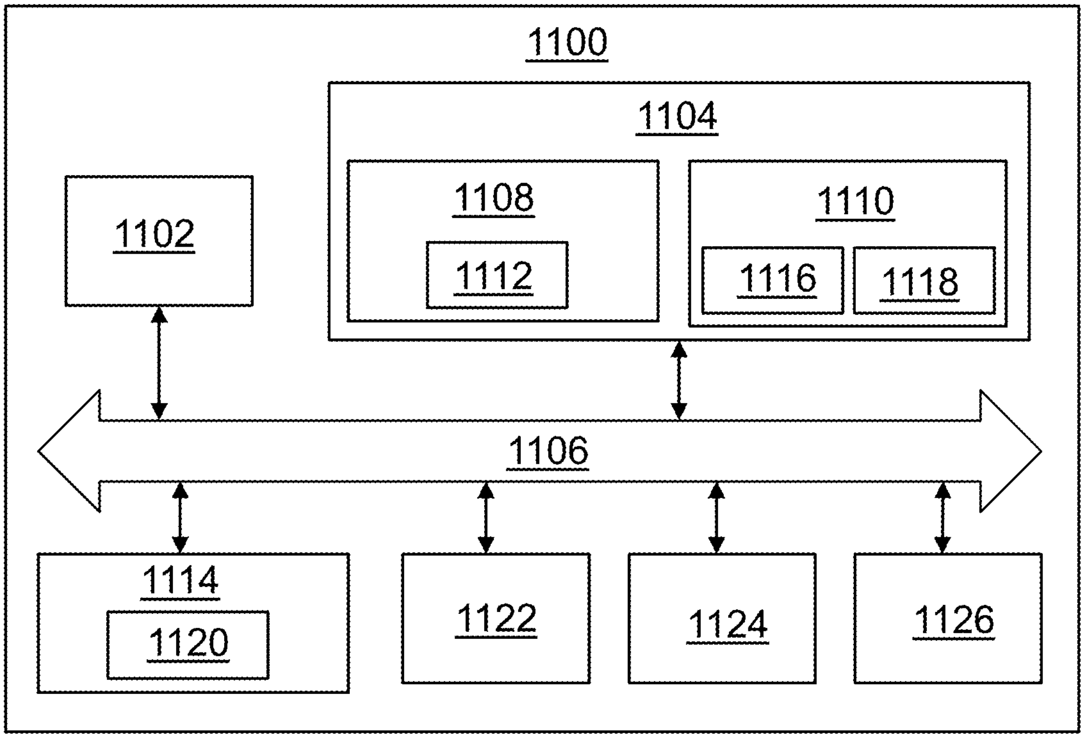
FIG. 11 is a schematic diagram of an exemplary computer system for implementing examples disclosed herein, according to an example.

FIG. 11 is a schematic diagram of the computer system 1100 for implementing examples disclosed herein. The computer system 1100 may be part of or communicatively coupled with a control system for controlling units of the vehicle 1, the vehicle 10 or any other vehicle comprising a truck or tractor and at least one trailer, e.g. to perform any of actions 602-610. The computer system 1100 may for example comprise any of the modules, models, or units. The computer system 1100 is arranged and configured to communicate with an electronically controllable suspension system of the at least one trailer.

The computer system 1100 is adapted to execute instructions from a computer-readable medium to perform these and/or any of the functions or processing described herein. The computer system 1100 may be connected (e.g., networked) to other machines in a LAN, an intranet, an extranet, or the Internet. While only a single device is illustrated, the computer system 1100 may include any collection of devices that individually or jointly execute a set (or multiple sets) of instructions to perform any one or more of the methodologies discussed herein. Accordingly, any reference in the disclosure and/or claims to a computer system, computing system, computer device, computing device, control system, control unit, electronic control unit (ECU), processor device, etc., includes reference to one or more such devices to individually or jointly execute a set (or multiple sets) of instructions to perform any one or more of the methodologies discussed herein. For example, control system may include a single control unit, or a plurality of control units connected or otherwise communicatively coupled to each other, such that any performed function may be distributed between the control units as desired. Further, such devices may communicate with each other or other devices by various system architectures, such as directly or via a Controller Arca Network (CAN) bus, etc.

The computer system 1100 may comprise at least one computing device or electronic device capable of including firmware, hardware, and/or executing software instructions to implement the functionality described herein. The computer system 1100 may include a processor device 1102 (may also be referred to as a control unit), a memory 1104, and a system bus 1106. The computer system 1100 may include at least one computing device having the processor device 1102. The system bus 1106 provides an interface for system components including, but not limited to, the memory 1104 and the processor device 1102. The processor device 1102 may include any number of hardware components for conducting data or signal processing or for executing computer code stored in memory 1104. The processor device 1102 (e.g., control unit) may, for example, include a general-purpose processor, an application specific processor, a Digital Signal Processor (DSP), an Application Specific Integrated Circuit (ASIC), a Field Programmable Gate Array (FPGA), a circuit containing processing components, a group of distributed processing components, a group of distributed computers configured for processing, or other programmable logic device, discrete gate or transistor logic, discrete hardware components, or any combination thereof designed to perform the functions described herein. The processor device may further include computer executable code that controls operation of the programmable device.

The system bus 1106 may be any of several types of bus structures that may further interconnect to a memory bus (with or without a memory controller), a peripheral bus, and/or a local bus using any of a variety of bus architectures. The memory 1104 may be one or more devices for storing data and/or computer code for completing or facilitating methods described herein. The memory 1104 may include database components, object code components, script components, or other types of information structure for supporting the various activities herein. Any distributed or local memory device may be utilized with the systems and methods of this description. The memory 1104 may be communicably connected to the processor device 1102 (e.g., via a circuit or any other wired, wireless, or network connection) and may include computer code for executing one or more processes described herein. The memory 1104 may include non-volatile memory 1108 (e.g., read-only memory (ROM), erasable programmable read-only memory (EPROM), electrically erasable programmable read-only memory (EEPROM), etc.), and volatile memory 1110 (e.g., random-access memory (RAM)), or any other medium which can be used to carry or store desired program code in the form of machine-executable instructions or data structures and which can be accessed by a computer or other machine with a processor device 1102. A basic input/output system (BIOS) 1112 may be stored in the non-volatile memory 1108 and can include the basic routines that help to transfer information between elements within the computer system 1100.

The computer system 1100 may further include or be coupled to a non-transitory computer-readable storage medium such as the storage device 1114, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 1114 and other drives associated with computer-readable media and computer-usable media may provide non-volatile storage of data, data structures, computer-executable instructions, and the like.

A number of modules can be implemented as software and/or hard-coded in circuitry to implement the functionality described herein in whole or in part. The modules may be stored in the storage device 1114 and/or in the volatile memory 1110, which may include an operating system 11111 and/or one or more program modules 1118. All or a portion of the examples disclosed herein may be implemented as a computer program product 1120 stored on a transitory or non-transitory computer-usable or computer-readable storage medium (e.g., single medium or multiple media), such as the storage device 1114, which includes complex programming instructions (e.g., complex computer-readable program code) to cause the processor device 1102 to carry out the steps described herein. Thus, the computer-readable program code can comprise software instructions for implementing the functionality of the examples described herein when executed by the processor device 1102. The processor device 1102 may serve as a controller or control system for the computer system 1100 that is to implement the functionality described herein.

The computer system 1100 may also include an input device interface 1122 (e.g., input device interface and/or output device interface). The input device interface 1122 may be configured to receive input and selections to be communicated to the computer system 1100 when executing instructions, such as from a keyboard, mouse, touch-sensitive surface, etc. Such input devices may be connected to the processor device 1102 through the input device interface 1122 coupled to the system bus 1106 but can be connected through other interfaces such as a parallel port, an Institute of Electrical and Electronic Engineers (IEEE) 1394 serial port, a Universal Serial Bus (USB) port, an IR interface, and the like. The computer system 1100 may include an output device interface 1124 configured to forward output, such as to a display, a video display unit (e.g., a liquid crystal display (LCD) or a cathode ray tube (CRT)). The computer system 1100 may also include a communications interface 1126 suitable for communicating with a network as appropriate or desired.

The operational steps described in any of the exemplary aspects herein are described to provide examples and discussion. The steps may be performed by hardware components, may be embodied in machine-executable instructions to cause a processor to perform the steps, or may be performed by a combination of hardware and software. Although a specific order of method steps may be shown or described, the order of the steps may differ. In addition, two or more steps may be performed concurrently or with partial concurrence.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the inventive concepts being set forth in the following claims.

What is claimed is:

1. A computer-implemented method for controlling stability of a vehicle comprising a truck or tractor and at least one trailer comprising at least two wheel axles and an electronically controllable suspension system, the method comprising, by a processor device of a computer system:

identifying a possible instability state of the vehicle;

determining a type of an event that has caused the possible instability state of the vehicle;

determining one or more actions comprising adjusting a load distribution between the at least two wheel axles of the trailer based on the possible instability state of the vehicle and based on the type of the event that has caused the possible instability state of the vehicle; and generating and sending a control command to the suspension system to perform the one or more actions.

2. The computer-implemented method according to claim 1, wherein the type of the event that has caused the possible instability state of the vehicle comprises one or more of braking, a lane change, overtaking another vehicle, turning, and/or performing an evasive maneuver by the vehicle.

3. The computer-implemented method according to claim 1, wherein identifying the possible instability state of the vehicle is performed by determining a steering angle, a steering rate, a steering acceleration, and a value of at least one motion parameter of the vehicle.

4. The computer-implemented method according to claim 3, wherein the at least one motion parameter of the vehicle comprises one or more of a speed, a longitudinal velocity, a lateral velocity, a yaw rate, a lateral acceleration, a longitudinal acceleration, a roll rate, a roll angle, and an articulation angle of the vehicle.

5. The computer-implemented method according to claim 3, wherein determining the type of the event that has caused the possible instability state of the vehicle comprises determining that the instability state of the vehicle is caused by one or more of the lane change, overtaking another vehicle, turning, and/or performing the evasive maneuver by the vehicle, by determining that one or more of the steering rate exceeds a steering rate threshold value, the steering acceleration exceeds a steering acceleration threshold value, and that the longitudinal velocity exceeds a longitudinal velocity threshold value.

6. The computer-implemented method according to claim 2, wherein, when it is determined that the instability state is caused by one or more of the lane change, overtaking another vehicle, turning, and/or performing the evasive maneuver by the vehicle, the one or more actions comprise one or more out of:

(i) adjusting the load distribution between the at least two wheel axles such that a load on a rear axle of the trailer is increased and a load on a front axle of the trailer is decreased;

(ii) lowering a height of the trailer;

(iii) stiffening the controllable suspension system of the trailer; and (iv) increasing a roll damping of the trailer by using the controllable suspension system.

7. The computer-implemented method according to claim 6, comprising, by the processor device, selecting one or more actions out of the actions (i) to (iv) based on predicting a roll-over of the vehicle and/or predicting a swing-out of the vehicle.

8. The computer-implemented method according to claim 6, comprising, by the processor device, when the at least one trailer comprises two or more trailers, selecting one or more different combinations of actions out of the actions (i) to (iv) for respective trailers of the two or more trailers.

9. The computer-implemented method according to claim 8, wherein adjusting the load distribution between the at least two wheel axles of a trailer of the two or more trailers comprises increasing a load on a rear axle of the trailer of the two or more trailers.

10. The computer-implemented method according to claim 8, wherein adjusting the load distribution between the at least two wheel axles of a trailer of the two or more trailers comprises increasing a load on a rear-most axle of the trailer of the two or more trailers up to a possible physical limit for the rear-most axle and increasing a load on at least one next rear-most axle of the trailer of the two or more trailers up to a possible physical limit for the at least one next rear-most axle until the load distribution is completed.

11. The computer-implemented method according to claim 1, wherein determining the one or more actions, comprising adjusting the load distribution between the at least two wheel axles, is performed based on a yaw rate amplification of the vehicle and/or the at least one trailer.

12. The computer-implemented method according to claim 1, wherein, when it is determined that the instability state is caused by the braking of the vehicle, the one or more actions comprise adjusting the load distribution between the at least two wheel axles based on a braking capability of each wheel axle of the at least two wheel axles and/or based on a braking capability of the trailer.

13. The computer-implemented method according to claim 3, wherein detecting the instability state is based on one or more out of a predicted upcoming change in operating conditions of the vehicle, road topography, traffic conditions, a predicted steering angle, a predicted steering rate, a predicted steering acceleration, and a predicted value of the at least one predicted motion parameter of the vehicle.

14. A vehicle comprising a processor device to perform the method of claim 1, the vehicle comprising a truck or tractor and at least one trailer.

15. The vehicle according to claim 14, wherein the at least one trailer comprises one or more of at least one trailer, at least one semitrailer, and at least one dolly.

16. The vehicle according to claim 15, wherein the one or more of the at least one trailer, the at least one semitrailer, and the at least one dolly are coupled to the truck or tractor in accordance with a speed of actuators for their respective suspension systems, such that the one or more of the at least one trailer, the at least one semitrailer, and the at least one dolly comprising a fastest actuator of is directly coupled to the truck or tractor.

17. A computer program product comprising program code for performing, when executed by a processor device, the method of claim 1.

18. A control system for controlling a vehicle comprising a truck or tractor and at least one trailer, the control system being configured to communicate with a controllable suspension system of the at least one trailer and comprising one or more control units configured to perform, by a processor device, the method according to claim 1.

19. A non-transitory computer-readable storage medium comprising computer-executable instructions which, when executed by a processor device, cause the processor device to perform the method of claim 1.

* * * * *